(12) United States Patent
Maeda et al.

(10) Patent No.: US 7,284,595 B2
(45) Date of Patent: Oct. 23, 2007

(54) HEAT EXCHANGER FOR AIR CONDITIONER

(75) Inventors: Kenichiro Maeda, Neyagawa (JP); Yukio Uemura, Nagoya (JP); Kei Kajiya, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/168,059

(22) Filed: Jun. 28, 2005

(65) Prior Publication Data

US 2006/0005959 A1   Jan. 12, 2006

(30) Foreign Application Priority Data

Jun. 29, 2004 (JP) ............................. 2004-191245
Apr. 26, 2005 (JP) ............................. 2005-128275

(51) Int. Cl.
B60H 1/00 (2006.01)
B60H 1/08 (2006.01)

(52) U.S. Cl. ................... 165/42; 165/43; 165/202; 165/203; 165/86; 165/103; 237/123 A; 237/12.3 B

(58) Field of Classification Search .............. 165/41, 165/42, 43, 202, 86, 103; 237/12.3 A, 12.3 B
See application file for complete search history.

(56) References Cited

U.S. PATENT DOCUMENTS 5,170,841 A * 12/1992 Briet ........................... 165/76

2003/0159816 A1 * 8/2003 Kodumudi et al. ......... 165/176

FOREIGN PATENT DOCUMENTS

| CA | 488281 | * | 11/1952 |
|---|---|---|---|
| JP | 55118594 A | * | 9/1980 |
| JP | 63-117612 | | 7/1988 |
| JP | 2001-047845 | | 2/2001 |
| JP | 2001-246921 | | 9/2001 |
| SU | 1500517 A | * | 8/1989 |

OTHER PUBLICATIONS

In re Miskinyar, 28 USPQ2d 1789 (Fed. Cir. 1993), unpublished.*

* cited by examiner

*Primary Examiner*—John K. Ford
(74) *Attorney, Agent, or Firm*—Harness, Dickey & Pierce, PLC

(57) ABSTRACT

A heat source fluid inlet pipe of a heat exchanger main body 150 comprises a rotation side inlet pipe 27 and a fixed side inlet pipe 23 that are integrated with the heat exchanger main body 150. A heat source fluid outlet pipe comprises a rotation side outlet pipe 26 and a fixed side outlet pipe 22 that are integrated with the heat exchanger main body 150. These pipes 22, 23, 26 and 27 are constituted into a coaxial double-piping structure 16 and the heat exchanger main body 150 is allowed to rotate with a center axis A of this coaxial double-piping structure 16 as the center.

13 Claims, 12 Drawing Sheets

US 7,284,595 B2

HEAT EXCHANGER FOR AIR CONDITIONER

BACKGROUND OF THE INVENTION

1. Field of the Invention

This invention relates to a coaxial double piping structure for charging and discharging a heat source fluid in an air conditioning heat exchanger used as means for heat-exchanging air in a car. More particularly, the invention is effective when it is applied to an air conditioning heat exchanger of the type in which the air conditioning heat exchanger itself is so constituted as to be capable of rotating.

2. Description of the Related Art

An air-mix-type, that regulates the ratio of cold air and warm air by using an air-mix door and adjusts a temperature of air blowing to a passenger compartment, is a typical example of a temperature regulation system of an air conditioner for a car.

In this air-mix-type air condition for a car, Japanese Unexamined Patent Publications No. 2001-47845 and No. 2001-246921 disclose an air conditioner in which a hot-water-type heat exchanger for heating is so constituted as to be capable of rotating and is also allowed to play the role of the air-mix-door. Consequently, an air-mix-door can be eliminated and, at the time of maximum cooling, the hot-water-type heat exchanger for heating is operated and rotated to a position so that it does not operate as a resistance to a cold air flow and can increase the flow of cold air.

More concretely, according to the first reference No. 2001-47845, a hot water inlet pipe and a hot water outlet pipe on the fixed side are joined in a spaced-apart relation with a predetermined distance to one of the side surfaces of a disk-like member on the fixed side in a radial direction, and an inlet arc groove communicating with the hot water inlet pipe and an outlet arc groove communicating with the hot water outlet pipe are formed on the other side surface of the disc-like member on the fixed side.

On the other hand, two through-holes are formed in a spaced-apart relation in the rotation side disc-like member opposing the fixed side disc-like ember, and a hot water inlet pipe and a hot water outlet pipe on the rotation side that are integral with the hot-water-type heat exchanger for heating are connected to these through-holes in such a manner as to communicate the hot water inlet pipe on the rotation side with the inlet arc groove of the disc-like member on the fixed side and the hot water outlet pipe on the rotation side with the outlet arc groove of the disc-like member on the fixed side.

A seal material is arranged at each peripheral edge portion of the inlet and outlet arc grooves on the other surface of the disc-like member on the fixed side and is clamped between the fixed side disc-like member and the rotation side disc-like member to seal the hot water passage communication portion between the disc-like members.

According to the latter reference, i.e. Japanese Unexamined Patent Publication No. 2001-246921, the rotation side hot water inlet pipe integral with the hot water inlet tank of the heat exchanger for heating is sealed and connected to the fixed side hot water inlet pipe in such a manner as to be capable rotating, and the rotation side hot water outlet pipe integral with the hot water outlet tank of the heat exchanger for heating is sealed and connected to the fixed side hot water outlet pipe in such a manner as to be capable rotating.

In Japanese Unexamined Patent Publication No. 2001-47845, the hot water inlet pipe and the hot water outlet pipe are arranged in a spaced-apart relation in the radial direction of the fixed side disc-like member and the rotation side disc-like member. Therefore, the diameters of both disc-like members become unavoidably large.

Because the surface seal structure in which the seal member is clamped between disc-like members is employed, it is difficult to secure a uniform surface pressure throughout the entire length of the seal material and seal defect is likely to occur.

In Japanese Unexamined Patent Publication No. 2001-246921, the hot water inlet pipe and the host water outlet pipe protrude from the hot water inlet tank and the hot water outlet tank, respectively, in the mutually opposite directions. Therefore, a connection work of the fixed side pipe and the rotation side pipe must be carried out on both sides of the heat exchanger for heating and the assembly work factor is deteriorated. Because the hot water inlet pipe and the hot water outlet pipe protrude in mutually opposite directions, the arrangement performance of these hot water pipe is deteriorated, too.

The same problem occurs also when the cooling heat exchanger itself is allowed to rotate and to play the role of the air-mix door.

SUMMARY OF THE INVENTION

In view of the problems described above, the invention aims at reducing the size of a piping connection structure for charging and discharging a heat source fluid, such as hot water, while securing a heat exchanger rotation function in a rotary air conditioning heat exchanger.

It is another object of the invention to provide a piping connection structure for charging and discharging a heat source fluid having high seal performance in the rotary air conditioning heat exchanger.

It is still another object of the invention to provide a rotary air conditioning heat exchanger having a high assembly operation factor and a high piping handling performance.

To accomplish these objects, a first aspect of the invention provides an air conditioning heat exchanger including a heat exchanger main body (150) for executing heat exchange for air, heat source fluid inlet pipe (23, 27) for causing the heat source fluid to flow into the heat exchanger main body (150) and heat source fluid outlet pipe (22, 26) for causing the heat source fluid to flow out from the heat exchanger main body (150), wherein the heat source fluid inlet pipe comprises a rotation side inlet pipe (27) integral with the heat exchanger main body (150) and a fixed side inlet pipe (23) communicating with the rotation side inlet pipe (27); the heat source fluid outlet pipe comprises a rotation side outlet pipe (26) integral with the heat exchanger main body (150) and a fixed side outlet pipe (22) communicating with the rotation side outlet pipe (26); the rotation side inlet pipe (27) and the fixed side inlet pipe (23) and the rotation side outlet pipe (26) and the fixed side outlet pipe (22) are constituted into a coaxial double-piping structure (16); and the heat exchanger main body (150) is so constituted as to be capable of rotating with a center axis (A) of the coaxial double-piping structure (16) as the center.

According to this construction, the piping connection structure for charging and discharging the heat source fluid of the rotary air conditioning heat exchanger can be constituted by the coaxial double-piping structure (16) and can be shaped into a compact physical structure having a small outer diameter.

The connection between the rotation side inlet pipe (27) and the fixed inlet pipe (23) and connection between the rotation side outlet pipe (26) and the fixed side outlet pipe

(22) can be carried out by using the coaxial double piping structure (16) and the working factor of the piping connection is excellent.

Because the heat source fluid inlet pipe and the heat source fluid outlet pipe of the heat exchanger can be taken out from one position by using the coaxial double-piping structure (16), the outer fluid pipe to be connected to outlet/inlet pipe on the heat exchanger side needs be connected to only one position of the coaxial double-piping structure (16) and wiring performance of the outer fluid pipe is excellent.

Incidentally, the term "heat source fluid" used in this specification includes a high temperature fluid (hot water, etc) for heating air and a low temperature fluid (cold water, low temperature coolant, etc) for cooling air.

In the invention, a rotary portion (16b) of the coaxial double-piping structure (16) including the rotation side inlet pipe (27) and the rotation side outlet pipe (26) is brazed integrally with the heat exchanger main body (150).

According to this construction, the rotation portion (16b) of the coaxial double-piping structure (16) can be efficiently integrated with the heat exchanger main body (150) by utilizing, as such, the original integral brazing step without setting an assembly step dedicated to the rotary portion (16b) of the coaxial double-piping structure (16).

In the invention described above, the rotary portion (16b) of the coaxial double-piping structure (16) including the rotation side inlet pipe (27) and the rotation side outlet pipe (26) is sealed and fixed to the heat exchanger main body (150), by mechanical coupling means, through a seal member.

When the rotation member (16b) of the coaxial double-piping structure (16) is sealed and fixed to the heat exchanger main body (150) by using mechanical coupling means such as caulking as described above, a rotary air conditioning heat exchanger having the coaxial double-piping structure (16) can be provided by using, as such, an existing heat exchanger main body (150).

Therefore, no modification is necessary for a production setup of the air conditioning heat exchanger (particularly, expensive brazing setup) and the cost of the production setup can be reduced.

In the invention, the heat exchanger main body (150) includes a core (15e) formed by a plurality of tubes (15c) through which the heat source fluid-passes and fins (15d) bonded to the tubes (15c), an inlet tank (15a) connected to one of the ends of the tubes (15c) in a longitudinal direction, for distributing the heat source fluid to the plurality of tubes (15c) and an outlet tank (15b) connected to the other end of the tubes (15c) in the longitudinal direction, for gathering the heat source fluid from the plurality of tubes (15c); the heat exchanger main body (150) is of a full-path-type in which the heat source fluid flows unidirectionally from the inlet tank (15a) towards the outlet tank (15b) while passing through the plurality of tubes (15c); and the coaxial double-piping structure (16) is arranged at a portion of the heat exchanger main body (150) on the side of the outlet tank (15b).

Consequently, the invention can provide a rotary full-path-type air conditioning heat exchanger capable of operating and rotating the heat exchanger main body (150) with the outlet tank (15b) side as the center of rotation.

In the invention described above, the heat exchanger main body (150) includes the core (15e) formed by a plurality of tubes (15c) through which the heat source fluid passes and fins (15d) joined to the tubes (15c), the inlet tank (15a) connected to one of the ends of the tubes (15c) in the longitudinal direction, for distributing the heat source fluid to the plurality of tubes (15c) and the outlet tank (15b) connected to the other end of the tubes (15c) in the longitudinal direction, for gathering the heat source fluid from the plurality of tubes (15c); the heat exchanger main body (150) is of a full-path-type in which the heat source fluid flows unidirectionally from the inlet tank (15a) towards the outlet tank (15b) while passing through the plurality of tubes (15c); and the coaxial double-piping structure (150) is arranged at a portion of the heat exchanger main body (150) on the side of the inlet tank (15a).

Consequently, the invention can provide the rotary full-path-type air conditioning heat exchanger capable of operating and rotating the heat exchanger main body (150) with the inlet tank (15a) side as the center of rotation.

In the invention described above, the heat exchanger main body (150) includes the core (15e) formed by a plurality of tubes (15c) through which the heat source fluid passes and fins (15d) joined to the tubes (15c), the inlet tank (15a) connected to one of the ends of the tubes (15c) in the longitudinal direction, for distributing the heat source fluid to the plurality of tubes (15c) and the outlet tank (15b) connected to the other end of the tubes (15c) in the longitudinal direction, for gathering the heat source fluid from the plurality of tubes; the heat exchanger main body (150) is of a full-path-type in which the heat source fluid flows unidirectionally from the inlet tank (15a) towards the outlet tank (15b) while passing through the plurality of tubes (15c); and the coaxial double-piping structure (16) is arranged at an intermediate portion between the inlet tank (15a) and the outlet tank (15b) of the heat exchanger main body (150).

Consequently, the invention can provide a rotary full-path-type air conditioning heat exchanger capable of operating and rotating the heat exchanger main body (150) with the intermediate portion between the inlet tank (15a) and the outlet tank (15b) as the center of rotation. In other words, the invention can constitute the rotary full-path-type air conditioning heat exchanger in a butterfly door system.

In the invention described above, the heat source fluid inlet pipe and the heat source fluid outlet pipe of the exchanger can be taken out from one position by the coaxial double-piping structure (16). Because the inlet tank (15a) and the outlet tank (15b) are arranged in the spaced-apart relation at both ends in the longitudinal direction of the tubes (15c) in the full-path-type air conditioning heat exchanger, a communication piping (28) for causing the heat source fluid to flow from the coaxial double-piping structure (16) to the inlet tank (15a) and the outlet tank (15b) is necessary.

Therefore, in the invention described above, the heat exchanger main body (150) includes the core (15e) formed by a plurality of tubes (15c) through which the heat source fluid passes and fins (15d) joined to the tubes (15c), the inlet tank (15a) connected to one of the ends of a first tube group (15f) as a part of the tubes (15c) in the longitudinal direction, for distributing the heat source fluid to the plurality of tubes (15c), the outlet tank (15b) connected to one of the ends of a second tube group (15g) as the remaining part of the tubes (15c) in the longitudinal direction, for gathering the heat source fluid from the plurality of tubes (15c), and the intermediate tank (15h) connected to the other ends of the first and second tube groups (15h, 15g) in the longitudinal direction, to allow flow-in of the heat source fluid from the first tube group (15f) and flow-out of the heat source fluid to the second tube group (15g); the heat exchanger main body (150) is of a U-turn-type in which the heat source fluid flows while causing U-turn between the first tube group (15f) and the second tube group (15g); and the coaxial double-piping structure (16) is arranged at a portion of the heat exchanger main body (150) on the side to which the inlet tank (15a) and the outlet tank (15b) are connected.

According to this construction, the communication pipe (28) described above becomes unnecessary because the inlet tank (15a) and the outlet tank (15b) are arranged in the proximity of one of the ends of the tubes (15c) in the longitudinal direction. As a result, the piping connection structure can be formed into a more compact structure.

In the invention described above, the coaxial double-piping structure (16) is arranged at an intermediate portion between the inlet tank (15a) and the outlet tank (15b).

Consequently, the invention can provide the rotary U-turn-type air conditioning heat exchanger capable of operating and rotating the heat exchanger main body (150) with the intermediate portion between the inlet tank (15a) and the outlet tank (15b) as the center of rotation. In other words, the invention can constitute the rotary U-turn-type air conditioning heat exchanger as a butterfly door system.

In the invention, the heat exchanger main body (150) comprises a stacked structure of the tubes (15c) and the fins (15d), the first tube group (15f) is arranged on one of the sides of the stacking direction of the tubes (15c) and the fins (15d), the second tube group (15g) is arranged on the other side of the stacking direction, and the heat exchanger main body (150) is of the U-turn-type in which the flow of the heat source fluid U-turns in the stacking direction.

In the invention, the first tube group (15f) and the second tube group (15g) are arranged in front and in rear of the flowing direction of air passing through the heat exchanger main body (150), and the heat exchanger main body (150) is of the U-turn-type in which the flow of the heat source fluid U-turns in front and in rear of the air flowing direction.

In the invention, each of the rotation side inlet pipe and the fixed side inlet pipe comprises an outer pipe (27, 23) and each of the rotation side outlet pipe and the fixed side outlet pipe comprises an inner pipe (26, 22) in the coaxial-double piping structure (16).

In the invention, each of the rotation side inlet pipe and the fixed side inlet pipe comprises an inner pipe (26, 22) and each of the rotation side outlet pipe and the fixed side outlet pipe comprises an outer pipe (27, 23) in the coaxial double-piping structure (16).

In the invention, the coaxial double-piping structure (16) includes an inner leak seal mechanism (30) for preventing the heat source fluid from directly leaking from the fixed side inlet pipe (23) to the fixed side outlet pipe (22) and an outer leak seal mechanism (31) for preventing the heat source fluid from directly leaking to the outside, and both of the inner and outer leak seal mechanisms (30, 31) have a cylindrical seal structure using an O ring.

According to this construction, both seal mechanisms (30, 31) have a cylindrical seal structure using the O ring, and can therefore generate a uniform surface pressure throughout the entire circumference in the circumferential direction and can exhibit excellent seal performance. Moreover, in comparison with Japanese Unexamined Patent Publication No. 2001-47845, the seal area can be made smaller and the sliding friction of the seal portion can be reduced. Therefore, this construction can contribute to a reduction in the rotation driving force for the rotary-type air conditioning heat exchanger.

Another aspect of the invention provides a car air conditioner having the air conditioning heat exchanger (15) described above and an air conditioner case (11) in which air flows into a passenger compartment, wherein the air conditioning heat exchanger (15) is arranged inside the air conditioner case (11) in such a manner as to be capable of rotating; and a proportion of hot air or cold air passing through the air conditioning heat exchanger (15) to air bypassing the air conditioning heat exchanger (15) is regulated by changing the rotating position of the air conditioning heat exchanger (15).

Consequently, the above-mentioned functions and effects can be exhibited in the air-mix-type car air conditioner.

In anther aspect of the invention described above, the car air conditioner having the above-mentioned air conditioning heat exchanger (15) and air conditioner case (11) in which air flows into a passenger compartment, wherein the air conditioning heat exchanger (15) is arranged inside the air conditioner case (11) in such a manner as to be capable of rotating; a proportion of hot air or cold air passing through the air conditioning heat exchanger (15) to air bypassing the air conditioning heat exchanger (15) is regulated by changing the rotating position of the air conditioning heat exchanger (15); a fine clearance passage (D) exists in a contact surface on which the rotation side inlet pipe keeps contact with the fixed side inlet pipe in the outer pipe (27, 23) of the coaxial double-piping structure (16); and an outlet side portion (31b) of the fine clearance passage (D) from which the heat source fluid flows out to the outside communicates with the inside of the air conditioner case (11).

According to this construction, the heat source fluid passing through the fine clearance passage (D) existing in the contact surface (31a) between the rotation side inlet pipe and the fixed side inlet pipe of the outer pipe (27, 23) leaks out from the outlet side portion (31b) of the fine clearance passage (D) and flows into the air conditioner case (11).

As a result, the problem that the heat source fluid leaking outside flows into the passenger compartment can be eliminated.

Still another aspect of the invention provides a car air conditioner having the air conditioning heat exchanger (15) described above and an air conditioner case (11) in which air flows into a passenger compartment, wherein the air conditioning heat exchanger (15) is arranged inside the air conditioner case (11) in such a manner as to be capable of rotating; a proportion of hot air or cold air passing through the air conditioning heat exchanger (15) to air bypassing the air conditioning heat exchanger (15) is regulated by changing the rotating position of the air conditioning heat exchanger (15); the fine clearance passage (D) exists in a contact surface on which the rotation side outlet pipe keeps contact with the fixed side outlet pipe in the outer pipe (27, 23) of the coaxial double-piping structure; and an outlet side portion (31b) of the fine clearance passage (D) from which the heat source fluid flows out to the outside communicates with the inside of the air conditioner case (11).

According to this construction, the heat source fluid passing through the fine clearance passage (D) existing in the contact surface (31a) between the rotation side outlet pipe and the fixed side outlet pipe in the outer pipe (27, 23) of the coaxial double-piping structure (16) leaks out from the outlet side portion (31b) of the fine clearance passage (D) and flows into the air conditioner case (11).

As a result, the problem that the heat source fluid leaking outside flows into the passenger compartment can be eliminated.

In the invention described above, when a drain port (14) is arranged substantially at the lowermost part inside the air conditioner case (11), the heat source fluid leaking into the air conditioner case (11) from the outer leak seal mechanism (31) can be drained outside the passenger compartment from the drain port (14) arranged substantially at the lowest portion inside the air conditioner case (11).

In the invention described above, two air passages (48) are formed inside the air conditioner case (11) in parallel with each other, and the air conditioning heat exchangers are arranged in the two air passages independently of each other in such a manner as to be capable of rotating.

According to this construction, the temperatures of the air flows blowing from the two air passages (48) into the passenger compartment can be controlled independently of each other by independently controlling the proportion of hot air or cold air passing through the air conditioning heat exchanger (15) to air bypassing the air conditioning heat exchanger (15) inside the two air passages (48).

In the invention described above, one each coaxial double-piping structure (16) is arranged between the two air conditioning heat exchanges (15), one rotary portion (16b) including the rotation side inlet pipe (27) and the rotation side outlet pipe (26) in the coaxial double-piping structure (16) is disposed for each of the two air conditioning heat exchangers (15), only one fixed portion (16a) including the fixed side inlet pipe (23) and the fixed side outlet pipe (22) in the coaxial double-piping structure (16) is arranged between the two rotary portions (16b), the one fixed side inlet pipe (23) distributes the heat source fluid to the two air conditioning heat exchangers (15), and the one fixed side outlet pipe (23) gathers the heat source fluid from the two air conditioning heat exchangers (15).

According to this construction, only one fixed portion (16a) may be arranged for the two air conditioning heat exchangers (15). Therefore, the coaxial double-piping portion (16) can be made more compact in structure as a whole than when two fixed portions (16a) are provided respectively to the two air conditioning heat exchangers (15).

One fixed side inlet pipe (23) distributes the heat source fluid to the two air conditioning heat exchangers (15) and the fixed side outlet pipe (22) gathers the heat source fluids from the two air conditioning heat exchangers (15). Therefore, the connection portion of the outer fluid pipe connected to the outlet/input pipe on the side of the heat exchangers can be gathered to one position. Accordingly, in the independent control system car air conditioner, the trouble of connecting the outer fluid pipe to the two air conditioning heater exchangers (15) can be eliminated and the working factor of piping connection is high.

Still another aspect of the invention provides an air conditioning heat exchanger comprising a heat exchanger main body (150) for conducting heat exchange between air and a heat source fluid; a heat source fluid inlet pipe (23, 27) for causing the heat source fluid to flow into the heat exchanger main body (150); and a heat source fluid outlet pipe (22, 26) for causing the heat source fluid to flow out from the heat exchanger main body (150); wherein the heat source fluid inlet pipe (23, 27) and the heat source fluid outlet pipe (22, 26) are constituted into a coaxial double-piping structure (16).

In the fixed-type air conditioning heat exchanger that does not rotate, the heat source fluid inlet/outlet pipe structure may be constituted by the coaxial double-piping structure (16) as described above.

Incidentally, reference numerals inside parentheses, for each means, represent the correspondence relation with concrete means described in later-appearing embodiments.

The present invention may be more fully understood from the description of preferred embodiments thereof, as set forth below, together with the accompanying drawings.

DESCRIPTION OF THE PREFERRED EMBODIMENTS

First Embodiment

Figure 1:
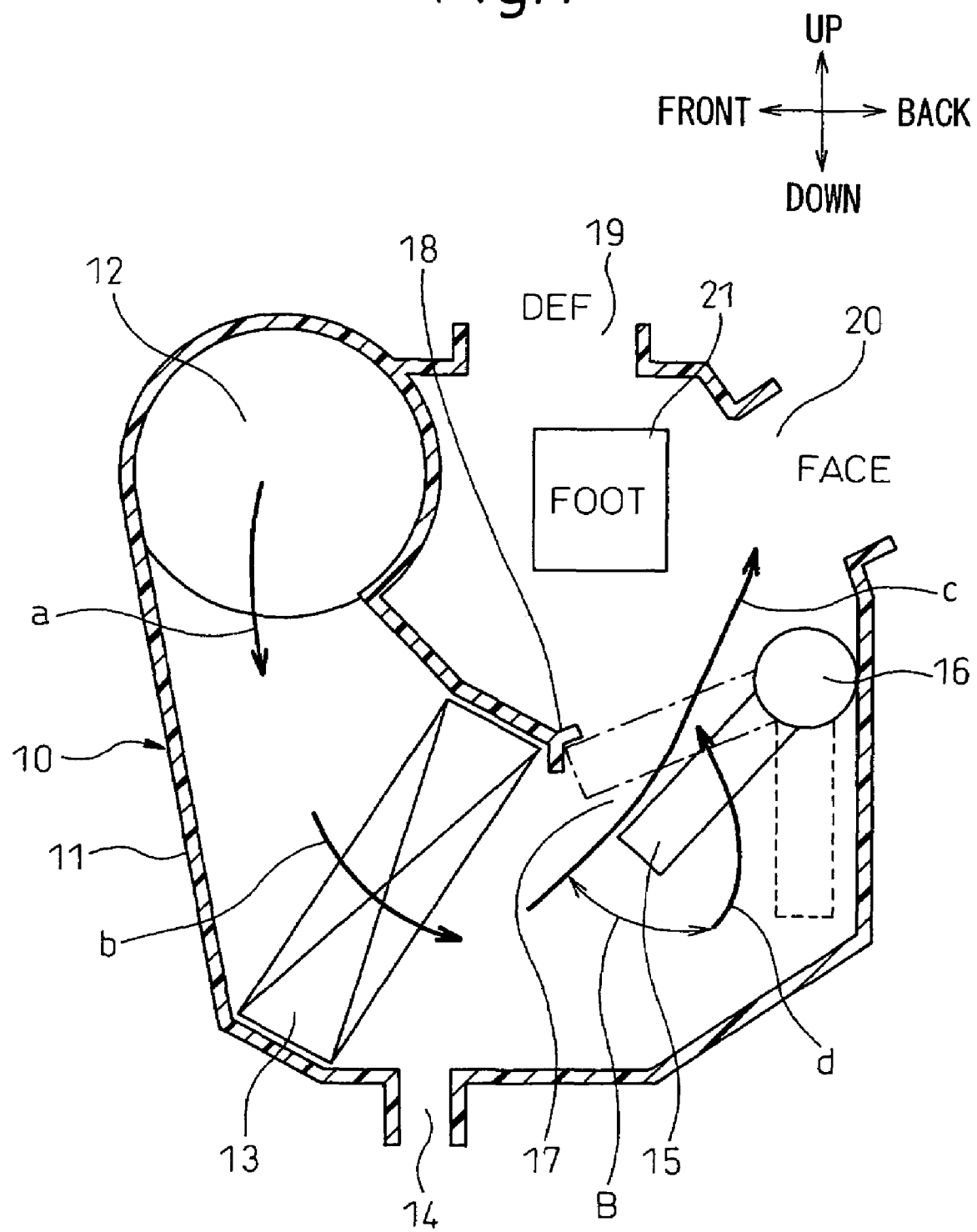
FIG. 1 is a schematic sectional view of a air conditioning unit in a passenger compartment for a car air conditioner according to a first embodiment of the invention.
Figure 2A:
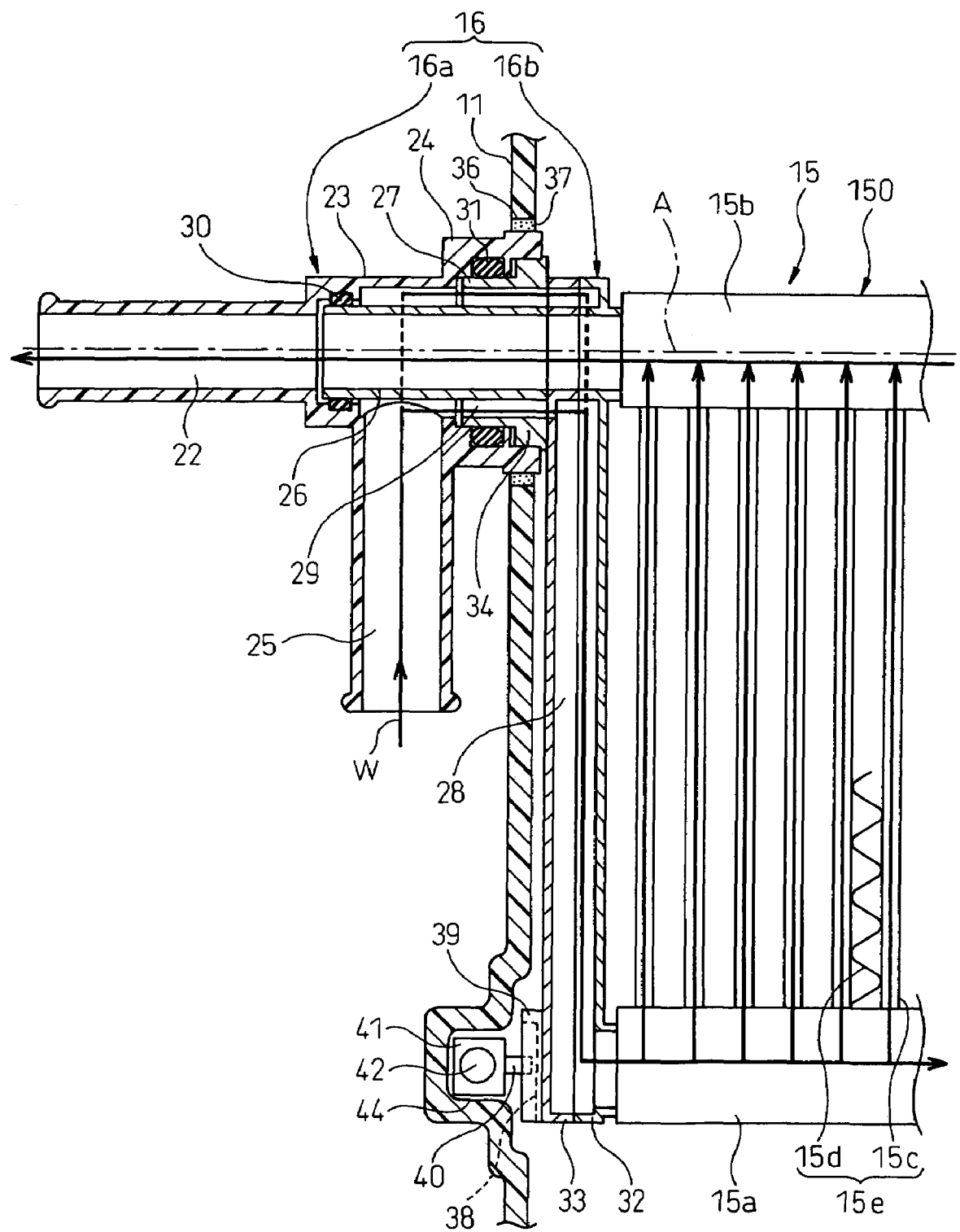
FIG. 2A is a sectional view of principal portions of a rotary-type air conditioning heat exchanger of the first embodiment.
Figure 2B:
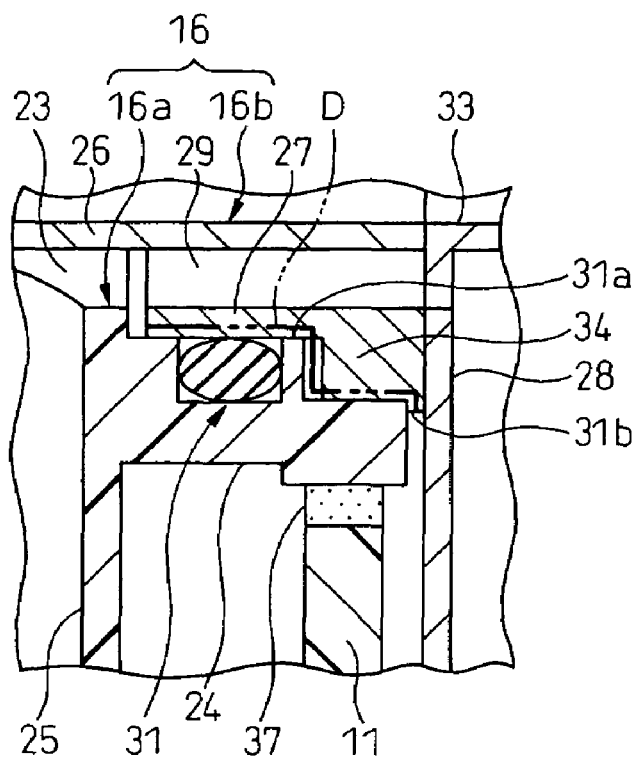
FIG. 2B is an enlarged view of an outer leak seal mechanism portion in FIG. 2A.
Figure 3:
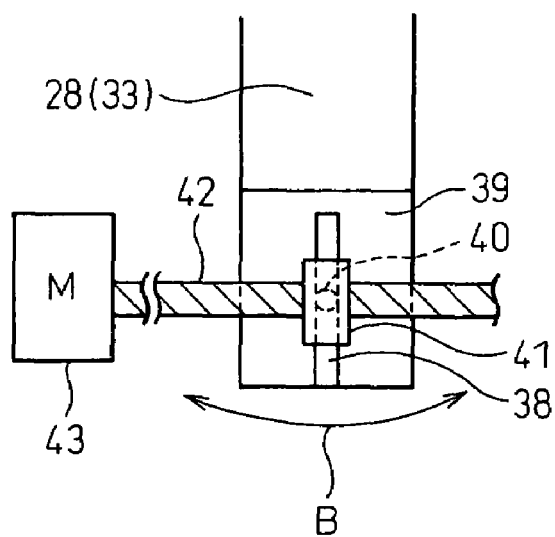
FIG. 3 is a schematic arrangement view of a rotation driving mechanism of the rotary-type air conditioning heat exchanger of the first embodiment.

FIGS. 1 to 4 show the first embodiment of the invention. FIG. 1 is a schematic sectional view of a air conditioning unit in a passenger compartment for a car air conditioner having a rotary-type heat exchanger for heating according to the first embodiment of the invention. FIG. 2A is a sectional view of principal portions of the rotary-type heat exchanger for heating in the first embodiment. FIG. 2B is an enlarged view of an outer leak seal mechanism portion in the rotary heat exchanger for heating. FIG. 3 is a schematic arrangement view of a rotation driving mechanism of the rotary heat exchanger for heating. FIG. 4A is a perspective view of a fixed side of a coaxial double-piping portion for charging and discharging hot water of the rotary heat exchanger for heating in the first embodiment and FIG. 4B is a perspective view of a rotary side portion.

First, an outline of the air conditioning unit 10 for the passenger compartment in the car air conditioner will be explained with reference to FIG. 1. The air conditioning unit 10 in the passenger compartment is arranged at an instrumental panel (not shown) at the front part inside the car that is substantially the center in the transverse direction of the car. Incidentally, vertical and transverse arrows in FIG. 1 indicate the directions under a car mounting state. The direction vertical to the sheet of drawing in FIG. 1 indicates the transverse (width-wise) direction of the car.

The car air conditioning unit 10 includes an air conditioner case 11 that is formed of a resin and constitutes a passage of air flowing into the passenger compartment. This air conditioner case 11 is practically molded into a plurality of split cases for the convenience of resin molding and the assembly of built-in components. The air conditioner case 11 is assembled by integrally fastening these split cases by fastening means such as screws and clips.

In this embodiment, a blower portion 12 is integrally arranged at an upper part on the front side of the car in the air conditioner case 11. The blower portion 12 drives and rotates a centrifugal blower fan, not shown, by a motor, not shown. An inner/outer air switch box (not shown) is connected to a suction port of the blower fan and introduction air (inner air or outer air) from this inner/outer air switch box is blown from above to below as indicated by an arrow (a).

An evaporator 13 constituting a heat exchanger for cooling is arranged at a lower part on the front side of the case inside the air conditioner case 11. Here, the evaporator 13 has a thin rectangular shape and the whole amount of blast air of the blower portion 12 flows as indicated by an arrow (b). The evaporator 13 is a low pressure side heat exchanger of a vapor-compression-type refrigeration cycle as is well known, and a low pressure coolant adsorbs and condenses heat from flowing air of the arrow (b) to cool this flowing air.

A drain port 14 is disposed at the lowest portion of the bottom surface of the air conditioner case 11 and condensation water generated in the evaporator 13 is discharged from this drain port 14 to the outside the passenger compartment.

A heater core 15 is arranged on the air flow downstream side of the evaporator 13 inside the air conditioner case 11. More concretely, the heater core 15 is arranged at the back of the evaporator 13 on the rear side of the car and on the upper side of the evaporator 13. Here, the heater core 15 is a heat exchanger for heating that heats air by hot water (engine cooling water) from a car engine (not shown).

The heater core 15 has a coaxial double-piping portion 16 for charging and discharging, that is to be described later, and is capable of rotating with this coaxial double-piping portion 16 as its center. In this embodiment, the coaxial double-piping portion 16 is arranged to keep close contact with the wall surface of the air conditioner case 11 on the rear side of the car.

The heater core 15 is operated and rotated at the time of maximum cooling to the position indicated by broken line that extends substantially vertically along the wall surface of the air conditioner case 11 on the rear side of the car. Consequently, the whole amount of air (cold air) passing through the evaporator 13 flows while bypassing the heater core 15 as indicated by an arrow (c) and a maximum cooling performance can be exhibited. In other words, a bypass passage 17 of the heater core 15 is formed at a position of the heater core 15 on the front side of the car.

On the other hand, when the heat core 15 is operated and rotated towards the front side of the car and the distal end portion (lower end portion) of the heater core 15 reaches a one-dot-chain position at which it comes into contact with a seal surface 18 on the side of the air conditioner case 11, the heater core 15 fully closes the bypass passage 17 and the whole amount of evaporator passing air (cold air) passes through the heater core 15 and is heated. Therefore, maximum heating performance is exhibited.

A solid line position of the heater core 15 represents an example of intermediate opening during temperature control. At this operation position of intermediate opening, air on the upper side in the evaporator passing air (cold air) flows while bypassing the heater core 15 as indicated by arrow (c) and air on the lower side in the evaporator passing air (cold air) flows while passing through the heater core 15 as indicated by arrow (d), and is heated and becomes hot air.

Therefore, when the air flow ratio of cold air bypassing the heater core 15 and hot air passing through the heater core 15 is adjusted by adjusting the rotating position of the heater core 15, the temperature of the air inside the passenger compartment can be continuously adjusted.

Cold air bypassing the heater core 15 and hot air passing through the heater core 15 are mixed in the upper region of the heater core 15 (region in the proximity of a later-appearing food open portion 21) and flow into each blow portion 19, 20, 21 after converted to air-conditioning air having a predetermined temperature.

Next, the arrangement of the blow opening portions 19, 20 and 21 for blowing air to each portion of the passenger compartment will be explained. The blow opening portions 19, 20 and 21 are arranged at the car rear portion of the air conditioner case 11 or in other words, above the evaporator 13 and the heater core 15.

The defroster opening portion 19 is arranged on the upper surface portion of the air conditioner case 11, is connected to a defroster blow port on the upper surface of the instrumental panel of the car through a defroster duct, not shown, and blows air towards the inner surface of the wind shield from the defroster blow port.

The face opening portion 20 is arranged at the back of the defroster opening portion 19 on the car rear side, is connected to a face blow port arranged at an upper portion of the instrumental panel of the car through a face duct, not shown, and blows air towards the face of the driver from the face blow port.

The foot opening portion 21 is arranged on the side wall of each of the right and left sides of the air conditioner case 11 and blows air towards the foot side of the passenger through foot ducts, not shown. Incidentally, each of these defroster opening portion 19, face opening portion 20 and foot opening portion 21 can be opened and closed by a blow mode door not shown in the drawings.

Next, a concrete construction of the heater core 15 will be explained with reference to FIGS. 2A to 4. The hot water inlet tank 15a is arranged at one of the ends (lower end side in FIG. 2A) of the heater core 15 and the hot water outlet tank 15b is arranged at the other end of the heater core 15 (upper end side in FIG. 2A). A stacked structure of a plurality of flat tubes 15c and a plurality of corrugated heat transfer fins 15d constitutes a full path type (unidirectional flow type) heat exchange core 15e between both tanks 15a and 15b.

The plurality of flat tubes 15c is arranged in a line in parallel with one another in the transverse direction of the car. One of the ends (lower end portion) of all the flat tubes 15 communicates with the hot water inlet tank 15a and the other end (upper end portion) communicates with the hot water outlet tank 15b. Therefore, hot water flows unidirectionally from the hot water inlet tank 15a in parallel through all the flat tubes 15c towards the hot water outlet tank 15b.

Both tanks 15a and 15b have a shape that thinly extends in the arrangement direction (transverse direction of the car)

of the flat tubes 15c. Blow air inside the air conditioner case 10 passes through the spaces between the flat tubes 15c and the corrugated heat transfer fins 15d and is heated. Here, the hot water inlet tank 15a, the hot water outlet tank 15b, the flat tubes 15c and the corrugated heat transfer fins 15d together constitute the heat exchanger main body portion 150 of the heater core 15.

In this embodiment, the coaxial double-piping portion 16 for charging and discharging hot water is arranged on the side of the hot water inlet/outlet tank 15b (in the extension direction of the tank longitudinal direction). The coaxial double-piping portion 16 is broadly divided into a fixed fluid distribution pine portion 16a shown in FIG. 4A and a rotary fluid distribution pipe portion 16b shown in FIG. 4B.

Here, the fixed portion 16a is a fixed member that is fixed to the air conditioner case 11 by fitting means such as screw fastening, not shown in the drawing. In contrast, the rotary portion 16b is a rotary member that is integrally coupled to the heat exchanger main body 150 and rotates with the heat exchanger main body 150.

The fixed portion 16a has an inner pipe 22 constituting a minimum diameter portion, an outer pipe 23 having a greater diameter than the inner piping 22 and a ring-like portion 24 having a maximum diameter portion greater than the outer pipe 23. These inner pipe 22, outer pipe 23 and ring-like portion 24 are so formed as to continue with one another in the axial direction of the coaxial double-piping portion 16 (in the extension direction of the longitudinal direction of the hot water outlet tank 15b).

Therefore, the inner pipe 22, the outer pipe 23 and the ring-like portion 24 of the fixed portion 16a are formed into a concentric shape with the center axis A of rotation of the heater core 15 as the center and the diameter increases in the order of the inner pipe 22→outer pipe 23→ring-like portion 24.

An inlet pipe 25 for causing hot water to flow is coupled inside the outer pipe 23 in an orthogonal direction with respect to the outer pipe 23 (downward direction in FIG. 2A). More concretely, the inlet pipe 25 extends from the side of the hot water outlet tank 15b to the side of the hot water inlet tank 15a. In this embodiment, the fixed portion 16a is integrally molded from the resin material.

On the other hand, the rotary portion 16b includes an inner pipe 26, an outer pipe 27 so positioned as to be spaced apart by a predetermined spacing from the outer peripheral side of the inner pipe 26 and a communication pipe 28 interposed between both tanks 15a and 15b.

The inner pipe 26 of the rotary portion 16b is fitted into the inner peripheral side of the outer pipe 23 of the fixed portion 16a and continues the inner pipe 22 of the fixed portion 16a on the line. Of this inner pipe 26, the end portion on the opposite side to the inner pipe 22 on the fixed side (right side end portion in FIG. 2A) communicates with one of the ends of the hot water outlet tank 15b in the longitudinal direction.

An arrow W in FIG. 2A indicates the hot water flow passage. The inlet pipe 25 of the fixed portion 16a is connected to the hot water discharge side of the car engine not shown, and hot water flows into this pipe 25. The inlet pipe 25 communicates with the space 29 between the outer peripheral side of the inner pipe 26 and the inner peripheral side of the outer pipe 27 of the rotary portion 16b through the inner space of the outer pipe 23 on the fixed side. Furthermore, this space 29 communicates with one of the ends (upper end) of the inner passage of the communication pipe 28 and the other end of the inner passage of the communication pipe 28 communicates with one of the ends of the hot water inlet tank 15a in the longitudinal direction.

Consequently, hot water flowing into the inlet pipe 25 of the fixed portion 16a flows into the hot water inlet tank 15a through the inner passage of the outer pipe 23 of the fixed portion 16a→space 29→communication pipe 28. This hot water is distributed to a plurality of flat tubes 15c inside the hot water inlet tank 15a and flows from below to above through the plurality of flat tubes 15c.

Hot water from the plurality of flat tubes 15c flows into the hot water outlet tank 15b, is gathered, passes through the inner pipe 26 of the rotary portion 16b and flows out to the inner pipe 22 of the fixed portion 16a. As the inner pipe 22 of the fixed portion 16a is connected to the hot water suction side of the car engine hot water circuit, hot water of the inner pipe 22 of the fixed portion refluxes to the car engine hot water circuit.

Here, the inner pipe 26 of the rotary portion is longer in the axial direction than the outer pipe 27 and the distal end portion of the outer peripheral surface of the inner pipe 26 of the rotary portion 16b is fitted into the inner peripheral surface of the outer pipe 23 of the fixed portion 16a in such a manner as to be capable of rotating. An inner leak seal mechanism 30 using an O ring is disposed at the fitting portion between the distal end portion of the outer peripheral surface of the inner pipe 26 and the inner peripheral surface of the outer pipe 23.

The inner leak seal mechanism 30 prevents hot water flowing into the outer pipe 23 of the fixed portion 16a from directly flowing towards the inner pipe 22 or, in other words, prevents hot water from bypassing the heater core 15.

The outer peripheral surface of the outer pipe 27 of the rotary portion 16b is fitted to the inner peripheral surface of the ring-like portion 24 constituting the maximum diameter portion of the fixed portion 16a in such a manner as to be capable of rotating. An outer leak seal mechanism 31 using an O ring is disposed at the fitting portion between the outer peripheral surface of the outer pipe 27 on the rotation side and the inner peripheral surface of the ring-like portion 24 on the fixed side.

This outer leak seal mechanism 31 is constituted by the O ring in cooperation with the whole contact surface 31a between the inner peripheral surface of the ring-like portion 24 of the fixed portion 16a and the outer peripheral surface of the outer pipe 27 of the rotary portion 16b as shown in FIG. 2B, and prevents hot water flowing into the outer pipe 23 of the fixed portion 16a from directly flowing outside the coaxial double-piping portion 16.

Incidentally, a fine clearance passage D formed of a small clearance between the inner peripheral surface of the ring-like portion 24 of the fixed portion 16a and the outer peripheral surface of the outer pipe 27 of the rotary portion 16b exists on this contact surface 31a. The fine clearance passage D is indicated by two-dot-chain line on the more inner peripheral side than the outer peripheral surface of the outer piping 27 of the rotary portion 16b for the sake of illustration in FIG. 2B.

When seal performance of the outer seal mechanism 31 is deteriorated due to deterioration of the O-ring, etc, hot water leaks outside through this fine clearance passage D. Therefore, the outlet portion 31b, as the portion at which leaking hot water flows out in the fine clearance passage D, communicates with the inside of the air conditioner case 11.

Therefore, even when the seal performance of the outer leak seal mechanism 31 is deteriorated due to deterioration of the O-ring, etc, hot water leaking from the outer leak seal mechanism 31 passes through the fine clearance passage D and flows into the air conditioner case 11 from the outlet portion 31b.

Hot water flowing into the air conditioner case 11 is discharged outside the passenger compartment with condensation generated by the evaporator 13 from the drain port 14 (FIG. 1) formed at the lowest portion of the bottom surface of the air conditioner case 11.

Consequently, the problem that hot water leaking outside from the outer leak seal mechanism 31 due to deterioration of the seal performance of the outer leak seal mechanism 31 flows into the passenger compartment can be eliminated.

In this embodiment, each member 15a, 15b, 15c, 15d of the heat exchanger main body portion 150 of the heater core 15 is molded from a metal such as aluminum and is assembled by integral brazing. Therefore, the rotary member 16b, too, is molded from a metal such as aluminum and is integrally brazed to end portions of both tanks 15a and 15b of the heat exchanger main body portion 150 in the longitudinal direction when the heater core 15 is brazed. Consequently, the rotary portion 16 can be efficiently integrated with the heat exchanger main body portion 150 of the heater core 15.

Incidentally, because the rotary portion 16b is molded from the metal as described above, the rotary member 16b is molded in the split form of first to third portions 32, 33 and 34 and these three portions 32, 33 and 34 are integrally joined to one another by brazing.

In other words, the first portion 32 is a semi-split portion of the communication pipe 28 on the side of the heat exchanger main body portion 150. The second portion 33 is a semi-split portion of the communication pipe 28 on the opposite side to the heat exchanger main body portion 150. The third portion 34 is a double-piping portion of the inner pipe 26 and the outer pipe 27. The double-piping portion of this third portion 34 is integrally connected by a plurality of radial connection portions 35 (see FIG. 4B).

Next, the assembly structure of the heater core 15 to the air conditioner case 11 and the rotation driving mechanism of the heater core 15 will be explained. The wall surface of the air conditioner case 11 shown in FIG. 2A is a wall surface of one of the sides of the car in the transverse direction and a round through-hole 36 having an inner diameter greater by a predetermined size than the outer diameter of the ring-like portion 24 of the fixed portion 16a opens to this wall surface of the air conditioner case 11.

As the rotary portion 16b of the coaxial double-piping portion 16 is, in advance, integrated with the heater core 15, the heater core 15 is assembled into the air conditioner case 11 with this rotary portion 16b. More concretely, a shaft portion is provided to the other end (right end in FIG. 2A; not shown) of the hot water outlet tank 15b of the heater core 15 in the longitudinal direction and a fitting recess portion (not shown) for a bearing, into which the shaft portion fits in such a manner as to be rotating, is disposed on the wall surface of the air conditioner case 11 not shown in the drawing. Therefore, the shaft portion at the other end of the hot water outlet tank 15b of the heater core 15 in the longitudinal direction is rotatably fitted into the fitting recess portion for bearing of the air conditioner case 11.

The double-piping portion including the inner and outer pipes 26 and 27 of the rotary portion 16b positioned on the side of one of the end portions of the hot water outlet tank 15b of the heater core 15 in the longitudinal direction is inserted into the through-hole 36 of the air conditioner case 36.

Thereafter, the ring-like portion 24 of the fixed portion 16a of the coaxial double-piping portion 16 is inserted into the through-hole 36 from outside the air conditioner case 11 (from the left side in FIG. 2A) and the outer pipe 23 of the fixed portion 16a and the inner peripheral surface of the ring-like portion 24 are fitted to the outer peripheral surface of the inner and outer pipes 26 and 27 of the rotary portion 16b. A seal packing 37 is sandwiched between the through-hole 36 of the air conditioner case 11 and the ring-like portion 24 of the fixed portion 16a.

In the manner described above, both end portions of the hot water outlet tank 15b in the longitudinal direction can be supported by the air conditioner case 11 in such a manner as to be capable of rotating, and the seal performance between the ring-like portion 24 of the fixed portion and the through-hole 36 can be secured.

The rotation driving mechanism of the heater core 15 is disposed on the side of the hot water inlet tank 15a positioned on the opposite side to the rotation center axis A of the heater core 15. More concretely, a thinly elongated fitting groove 38 extending in the tube longitudinal direction of the heater core 15 (in the vertical direction in FIG. 2A) at the end portion of the communication pipe 28 on the side of the hot water inlet tank 15a.

The fitting groove 38 is formed into a thick portion 39 that is integral with, or separate from, the second portion 33 constituting the semi-split portion of the communication piping 28. Incidentally, when the thick portion 39 is formed separately from the second portion 33, the thick portion 39 is molded from the metal such as aluminum and may well be integrally brazed with the second portion 33 when the heater core 15 is brazed.

A pin 40 is slidably fitted into the fitting groove 38. The pin 40 is integrally provided to a nut 41 that constitutes a female screw member. The female screw of the nut 41 meshes with a male screw of a male screw member 42. The male screw member 42 is a shaft-like member that extends in the rotating direction B (FIGS. 1 and 3) on the side of the end portion in the longitudinal direction of the hot water inlet tank 15a which end portion is a rotation distal end of the heater core 15.

The length of the male screw member 42 in its axial direction is a length that exceeds a rotation displacement amount on the side of the hot water inlet tank 15a. A motor 43 as a driving actuator is connected to one of the ends of the male screw member 42 in the axial direction. Both ends of the male screw member 42 in the axial direction are so supported as to be capable of rotating by bearing hole portions formed in the air conditioner case 11.

The outer shape of the nut 41 is rectangular and a fitting recess 44 to which the nut 41 having the rectangular outer shape fits is formed in the inner wall of the air conditioner case 11. Therefore, the fitting recess 44 restricts (impedes) the rotation of the nut 41. The male screw member 42 and the nut 41 constitute a reduction mechanism for reducing the r.p.m of the motor.

The motor 43 is preferably arranged outside the air conditioner case 11. Therefore, one of the ends of the male screw member 42 in the axial direction is allowed to protrude outside the air conditioner case 11 through the bearing hole portion of the air conditioner case 11 and the motor 43 may then be connected to the protrusion end portion.

The motor 43 is electrically connected to the output side of an air conditioner controller not shown, and its rotating direction and a rotating amount (operation angle) are controlled by the output of the air conditioner controller.

Next, the operation of this embodiment will be explained. When the male screw member 42 is rotated by the rotation output of the motor 43, the nut 41 does not rotate because the rotation of the nut 41 is restricted by the fitting recess 44 of the air conditioner case 11 and only the male screw member 42 moves in the axial direction.

Consequently, a large reduction ratio can be set between the rotation amount of the motor 43 (male screw member 42) and the displacement amount of the nut 41 in the axial direction. A reduction mechanism is composed of the male screw member 42 and the nut 41. The pin 40 integrated with the nut 41 also is moved in the axial direction of the male screw member 42. As a result, the force of the male screw member 42 in the axial direction acts on the end portion of the heater core 15 on the side of the hot water inlet tank 15a through the fitting portion between the pin 40 and the fitting groove 38.

Here, the hot water outlet tank 15b positioned on the opposite side to the hot water inlet tank 15a in the heater core 15 can rotate with the rotation center axis A as the center. Therefore, the end portion of the heater core 15 on the side of the hot water inlet tank 15a is caused to rotate and displace by the force, in the axial direction, described above.

The error between the displacement of the pin 40 in the axial direction and the rotation displacement of the end portion of the heater core 15 on the side of the hot water inlet tank 15a can be absorbed because the fitting position between the pin 40 and the fitting groove 38 changes in the vertical direction in FIG. 3.

As described above, because the heater core 15 rotates with the rotation center axis A as the center, the rotating position of the heater core 15 can be arbitrarily controlled by controlling the rotating direction and the rotation amount (operation angle) of the motor, and the room blow air temperature can thus be adjusted.

The rotation driving force is applied to the rotation distal end side (on the side of the hot water inlet tank 15a) when the heater core 15 is driven and rotated. Therefore, the rotation driving force of the heater core 15 can be drastically reduced in comparison with the case where the rotation driving force is applied to the rotation center side (on the side of the hot water outlet tank 15b) of the heater core 15.

Next, in this embodiment, the coaxial double-piping portion 16 for charging and discharging hot water is constituted at one of the ends of the heater core 15 (at the end on the side of the hot water outlet tank 15b) and the heater core 15 is rotated with the center axis A of this coaxial double-piping portion 16 as the center. The concrete functions and effects of this construction will be hereinafter explained.

(1) The outer pipe 23 on the fixed side and the outer pipe 27 on the rotation side that constitute the flow passage on the hot water inlet side and the inner pipe 26 on the rotation side and the inner pipe 22 on the fixed side that constitute the flow passage on the hot water outlet side are constituted into the coaxial double-piping structure. Therefore, the physical structure (diameter) of the rotary piping connection structure for charging and discharging hot water can be made smaller than the structure described in Japanese Unexamined Patent Publication No. 2001-47845. Consequently, the design freedom of the air conditioner unit 10 for the passenger compartment can be improved.

(2) Because the coaxial double-piping structure is constituted, both inner leak seal mechanism 30 and outer leak seal mechanism 31 can be constituted into a cylindrical seal structure using the O ring. Owing to this cylindrical structure using the O ring, the O ring can be brought into pressure contact with the piping fitting surface at a uniform surface pressure throughout the entire periphery of the cylinder surface in the circumferential direction.

Therefore, the seal performance can be improved in comparison with the surface seal structure described in Japanese Unexamined Patent Publication No. 2001-47845.

(3) In the surface seal structure according to Japanese Unexamined Patent Publication No. 2001-47845, the seal member is arranged at the peripheral edge portion of each of the inlet arc groove and the outlet arc groove and the area of the seal material increases. In consequence, the rotation frictional force increases at the seal material portions and the rotation driving force of the heater core increases. In this embodiment, on the other hand, the diameter of the piping connection structure for charging and discharging hot water can be reduced as described above and the cylindrical seal structure is employed. Therefore, the area of the seal material can be reduced, so that the rotation frictional force of the seal material portion can be decreased and the rotation driving force of the heater core 15 can be reduced.

(4) As this embodiment can arrange the piping portion for charging and discharging hot water at one position by using the coaxial double-piping portion 16, the embodiment can improve the assembly operation factor on both fixed side and rotation side and arrangement freedom of the hot water piping in comparison with Japanese Unexamined Patent Publication No. 2001-246921.

(5) In this embodiment, the flow passage on the hot water inlet side is constituted by using the outer pipes 23 and 27 having a large number of bent portions and the communication pipe 28. Therefore, an excessive dynamic pressure of inlet hot water on the upstream side of the hot water inlet tank 15a can be mitigated. Therefore, when hot water is distributed from the hot water inlet tank 15a to a plurality of tubes 15c, a uniform distribution of hot water to the tubes 15c can be promoted and blast temperature distribution of the heater core 15 can be rendered uniform.

Figure 4A:
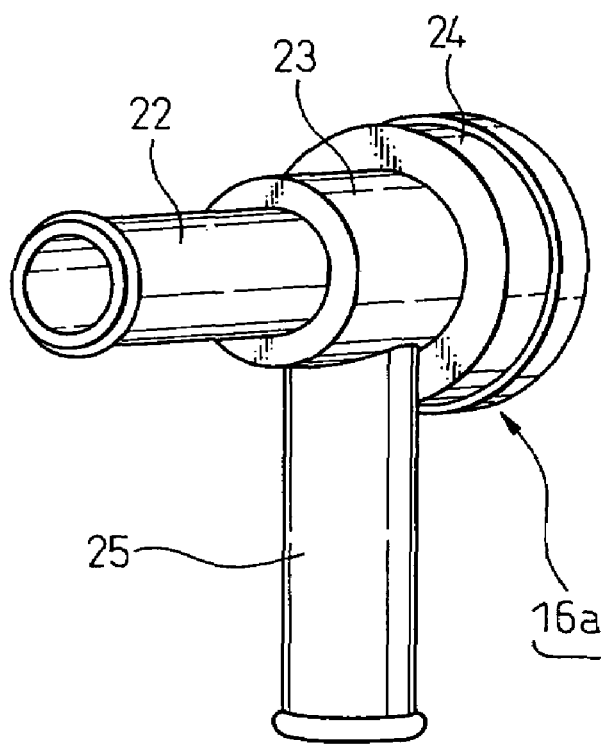
FIG. 4A is a perspective view of a fixed side of a coaxial double-piping portion for charging and discharging hot water in the first embodiment.
Figure 4B:
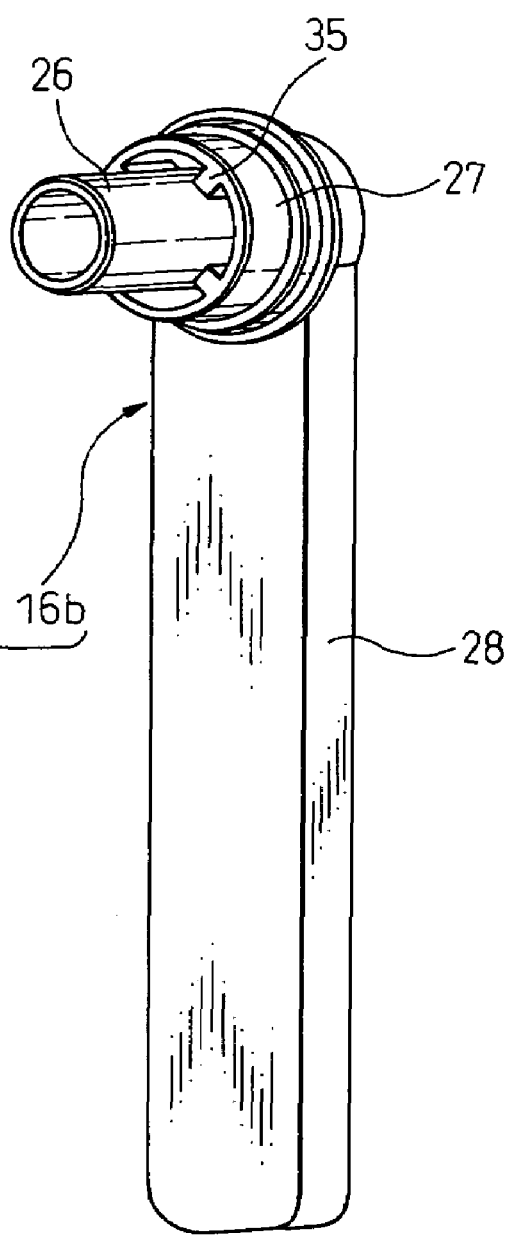
FIG. 4B is a perspective view of a rotary side of FIG. 4A.
Figure 5:
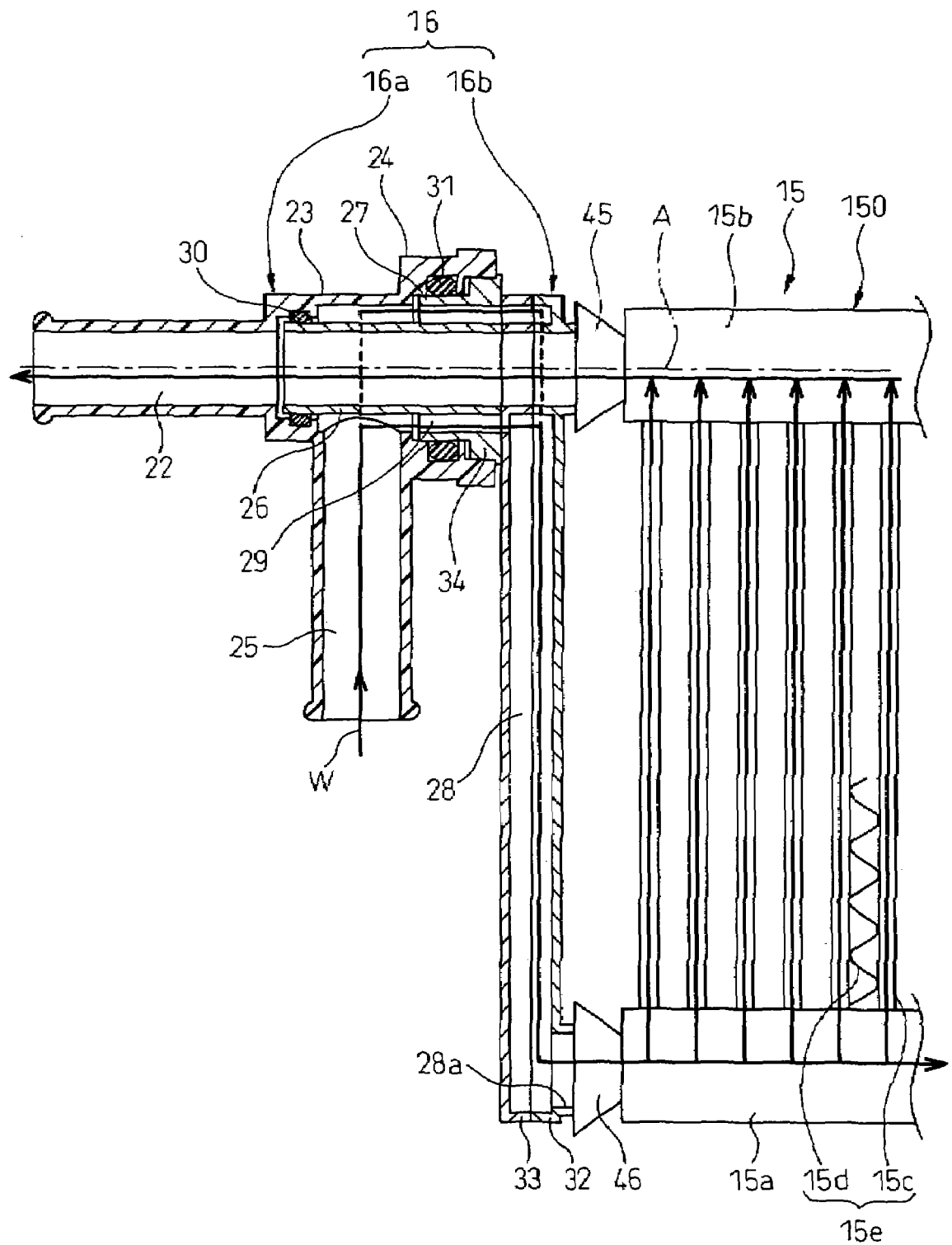
FIG. 5 is a sectional view of principal portions of a rotary-type air conditioning heat exchanger according to a second embodiment.

(6) The rotary portion 16b shown in FIG. 4B is integrated with the heat exchanger main body 150 of the heater core 15 by integral brazing. Therefore, setting of the assembly step dedicated to the rotary portion 16b is not necessary and the rotary portion 16b can be efficiently integrated with the heat exchanger main body 150 of the heater core 15 by utilizing as such the original assembly step of the heater core 15.

Second Embodiment

In the foregoing first embodiment, the rotary portion 16b shown in FIG. 4B is integrated with the heat exchanger main body 150 of the heater core 15 by brazing. In the second embodiment, the rotary portion 16b is in advance assembled into a unitary component by brazing, bonding, etc, while substantially cylindrical connection members 45 and 46 are integrally brazed with the end portions of both tanks 15a and 15b of the heat exchanger main body 150 of the heater core 15 in the longitudinal direction.

The end portion of the inner pipe 26 of the rotary portion 16b is fitted to the inner peripheral side of the connection member 45 through a sealant, not shown, and the connection member 45 is then caulked to seal and fix the end portion of the inner pipe 26 to the connection member 45. In consequence, the inner pipe 26 can be communicated with the inside of the hot water outlet tank 15b through the substantially cylindrical connection member 45.

Similarly, the cylindrical end portion 28a of the communication pipe 28 is fitted to the inner peripheral side of the connection member 46 through a sealant, not shown, and the connection member 46 is then caulked to seal and fix the cylindrical end portion 28a of the communication pipe 28 to the connection member 46. In consequence, the cylindrical end portion 28a of the communication pipe 28 can be communicated with the inside of the hot water inlet tank 15a through the substantially cylindrical connection member 46.

In the second embodiment, the substantially cylindrical connection members 45 and 46 need not be designed as the exclusive members but the hot water inlet pipe and the hot water outlet pipe in the ordinary heater cores 15 of the full pass type may be as such utilized.

According to the second embodiment, therefore, the existing heater core 15 can be as such utilized, and the heat core 15 can be produced by utilizing the existing apparatuses and devices without changing the expensive brazing setup, in particular. Consequently, the cost of the production setup of the heater core 15 can be reduced.

Third Embodiment

Figure 6:
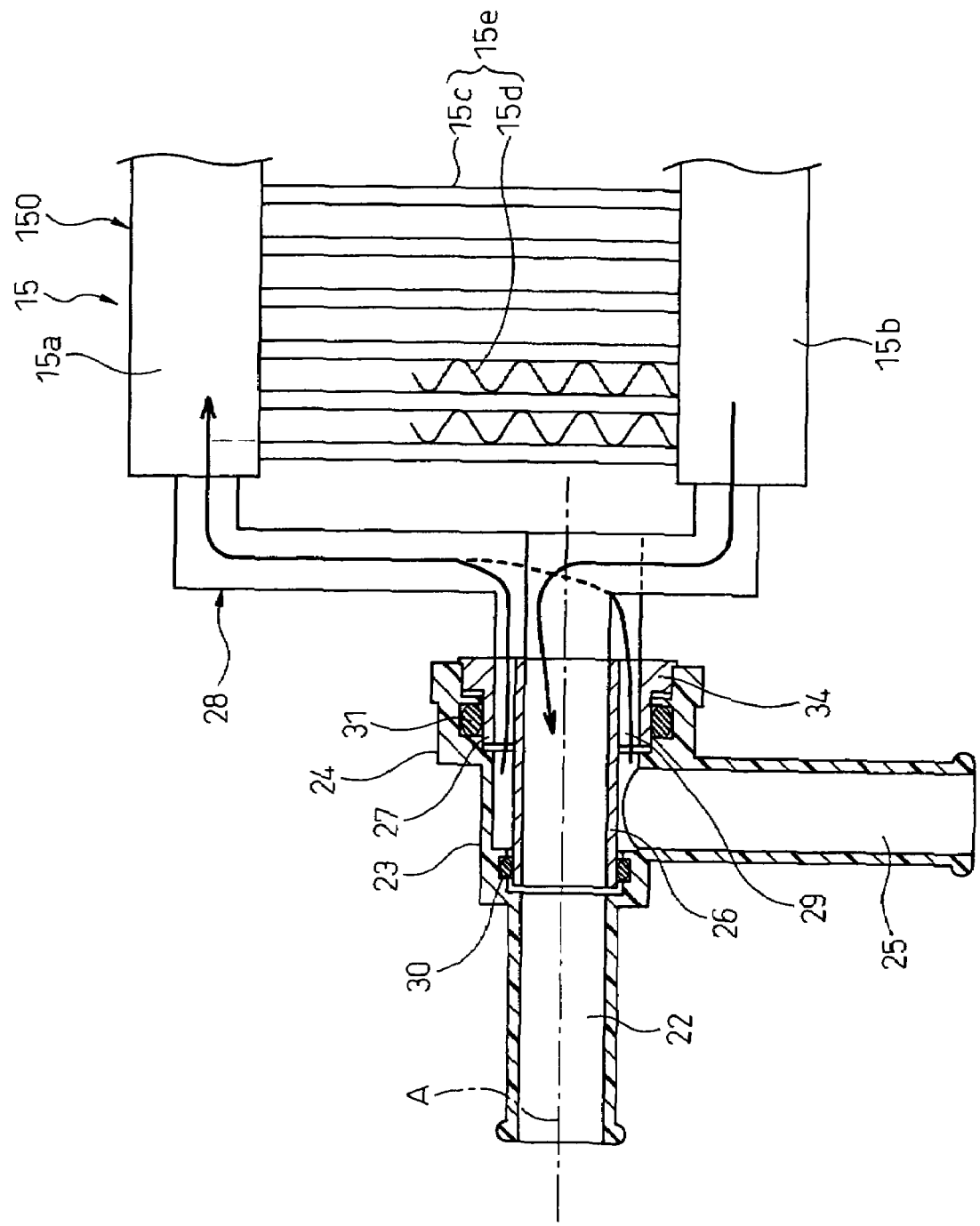
FIG. 6 is a sectional view of principal portions of a rotary-type air conditioning heat exchanger according to a third embodiment.

In the foregoing first embodiment, the coaxial double-piping portion 16 for charging and discharging hot water is arranged on one of the end sides of the heater core 15 (on the side of the hot water outlet tank 15b) and the rotation center axis A of the heater core 15 is set on one of the end sides of the heater core 15 (on the side of the hot water outlet tank 15b). In the third embodiment, however, the coaxial double-piping portion 16 for charging and discharging hot water is set to an intermediate position of the communication pipe 28 in the longitudinal direction and the rotation center axis A of the heater core 15 is set to an intermediate position between the hot water inlet tank 15a and hot water outlet tank 15b of the heater core 15 as shown in FIG. 6.

Figure 7:
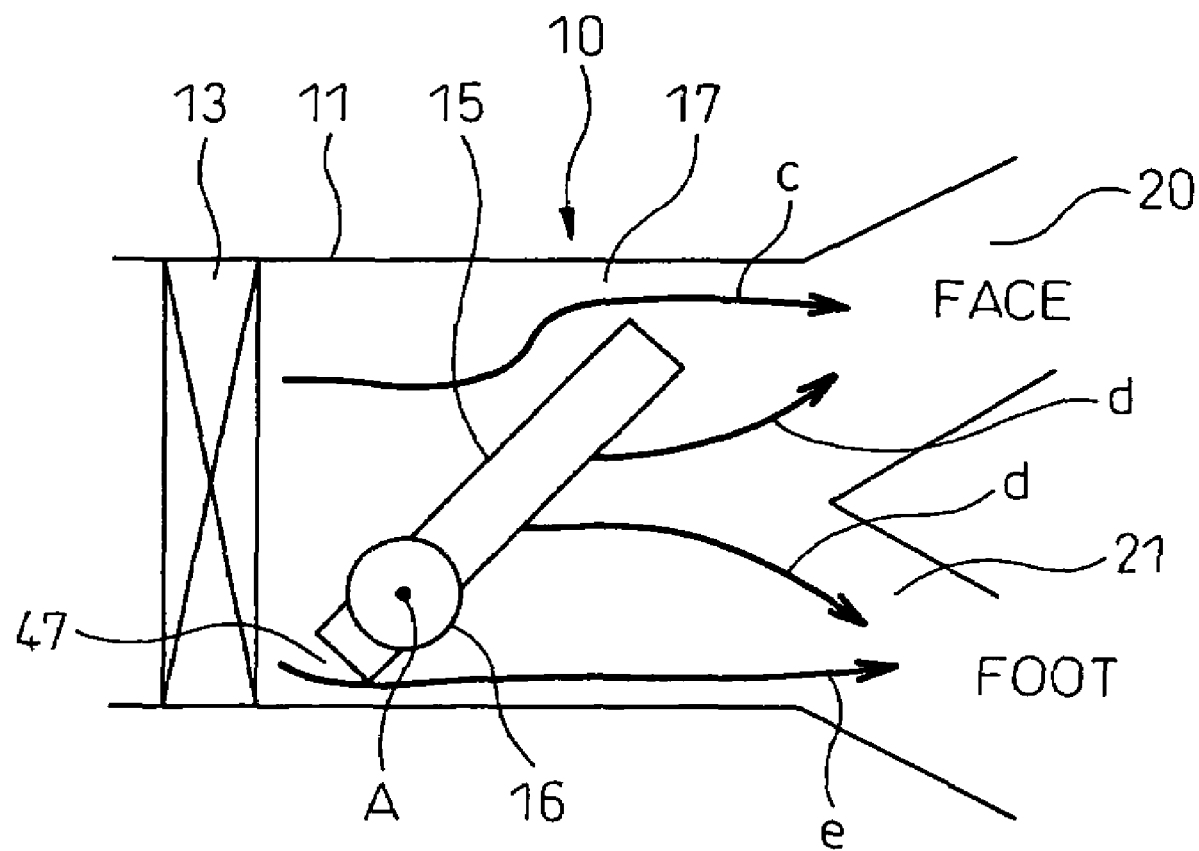
FIG. 7 is a schematic sectional view showing the state where the rotary-type air conditioning heat exchanger according to the third embodiment is arranged inside a air conditioning unit for a passenger compartment in a car air condition.

FIG. 7 shows a concrete example of the air conditioner unit 10 when the rotation center axis A of the heater core 15 is set to the intermediate position between the hot water inlet tank 15a of the heater core 15 and its hot water outlet tank 15b. FIG. 7 shows the state where the heater core 15 is operated and rotated to the intermediate opening position between the maximum cooling position and the maximum warming position when the face opening portion 20 and the foot opening portion 21 are simultaneously opened and the mode is set to a bi-level mode in which air-conditioned air is simultaneously blown towards the face and feet of the passenger.

According to the third embodiment, the rotation center axis A of the heater core 15 is arranged at the intermediate position of the heater core 15 but not at the end portion of the heater core 15. Therefore, when the heater core 15 is operated and rotated to the intermediate opening position of the heater core 15, the auxiliary bypass passage 47 can be formed between the end portion of the heater core 15 and the wall surface of the air conditioner case 11.

Incidentally, the cooling air flow (c) of the main bypass passage 17 (corresponding to the bypass passage 17 in FIG. 1) mainly flows to the face opening portion 20 during the bi-level mode. As a result, when the auxiliary bypass passage 47 is not formed, the blow air temperature from the face opening portion 20 becomes excessively low in comparison with the blow air temperature from the foot opening portion 21 and the difference between the upper and lower blast air temperatures becomes excessive, thereby impeding an air conditioned feeling.

In contrast, according to the third embodiment, the auxiliary bypass passage 47 is formed during the intermediate opening operation of the heater core 15 (that is, at the time of control to the intermediate temperature zone), and the cooling air flow (e) can be introduced to the foot opening portion 21 through this auxiliary bypass passage 47.

Accordingly, air conditioning feeling can be improved by decreasing the temperature difference (upper and lower blow air temperature difference) between the face blow air temperature and the foot blow air temperature in the bi-level mode.

Incidentally, the rotation driving mechanism of the heater core 15 in the second and third embodiments may be the same as that of the first embodiment. Therefore, the rotation driving mechanism is omitted from the drawings.

Fourth Embodiment

In the foregoing embodiments, the outer pipe 23, 27 constitutes the hot water inlet side flow passage in the coaxial double-piping portion 16 for charging and discharging hot water and the inner pipe 26, 22 constitutes the hot water outlet side flow passage. In this fourth embodiment, the outer pipe 23, 27 constitutes the hot water outlet side flow passage and the inner pipe 26, 27 constitutes the hot water outlet side flow passage, on the contrary.

Figure 12:
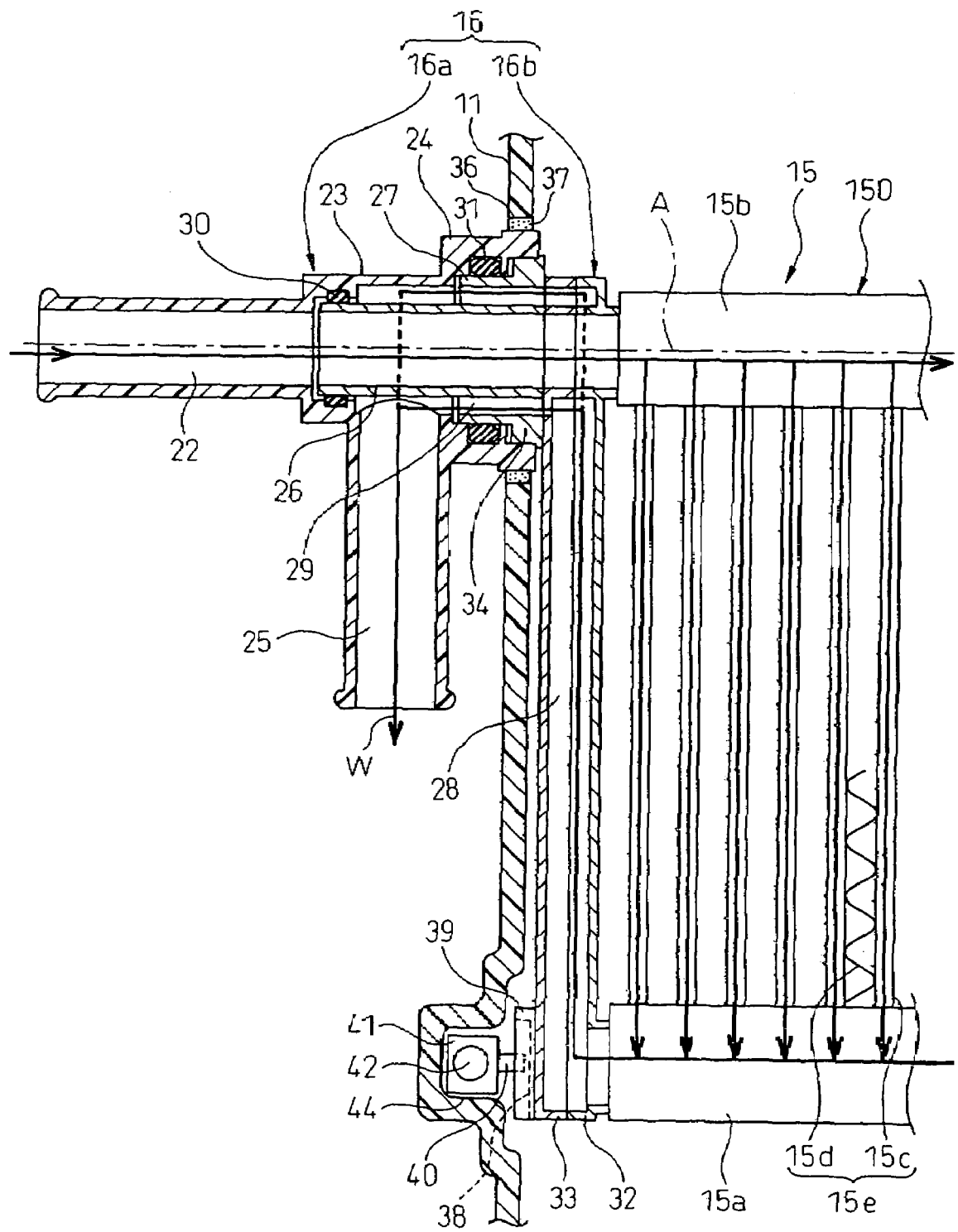
FIG. 12 is a sectional view similar to FIG. 2A, but showing a reversed fluid flow.

Such a construction of the fourth embodiment can be achieved by merely reversing the hot water flowing direction W in FIG. 2A as is illustrated in FIG. 12. However, the upper hot water outlet tank 15b in FIG. 12 operates as the hot water inlet tank and the lower hot water inlet tank 15a in FIG. 12 operates as the hot water outlet tank, and the hot water inlet pipe 25 operates as the hot water outlet pipe in the fourth embodiment.

According to the fourth embodiment, inlet side hot water having a high hot water pressure flows through the inner flow passage of the coaxial double-piping portion 16 and outlet side hot water having a low hot water pressure flows through the outer flow passage of the coaxial double-piping portion 16. Therefore, this embodiment is advantageous for preventing outer leak of hot water.

Because the inner pipes 26, 22 through which inlet side hot water having the high hot water pressure flows has a linear shape with less bending, the overall pressure loss of the entire flow passage inclusive of the hot water passages before and after the heater core 15 can be reduced.

Fifth Embodiment

Figure 8:
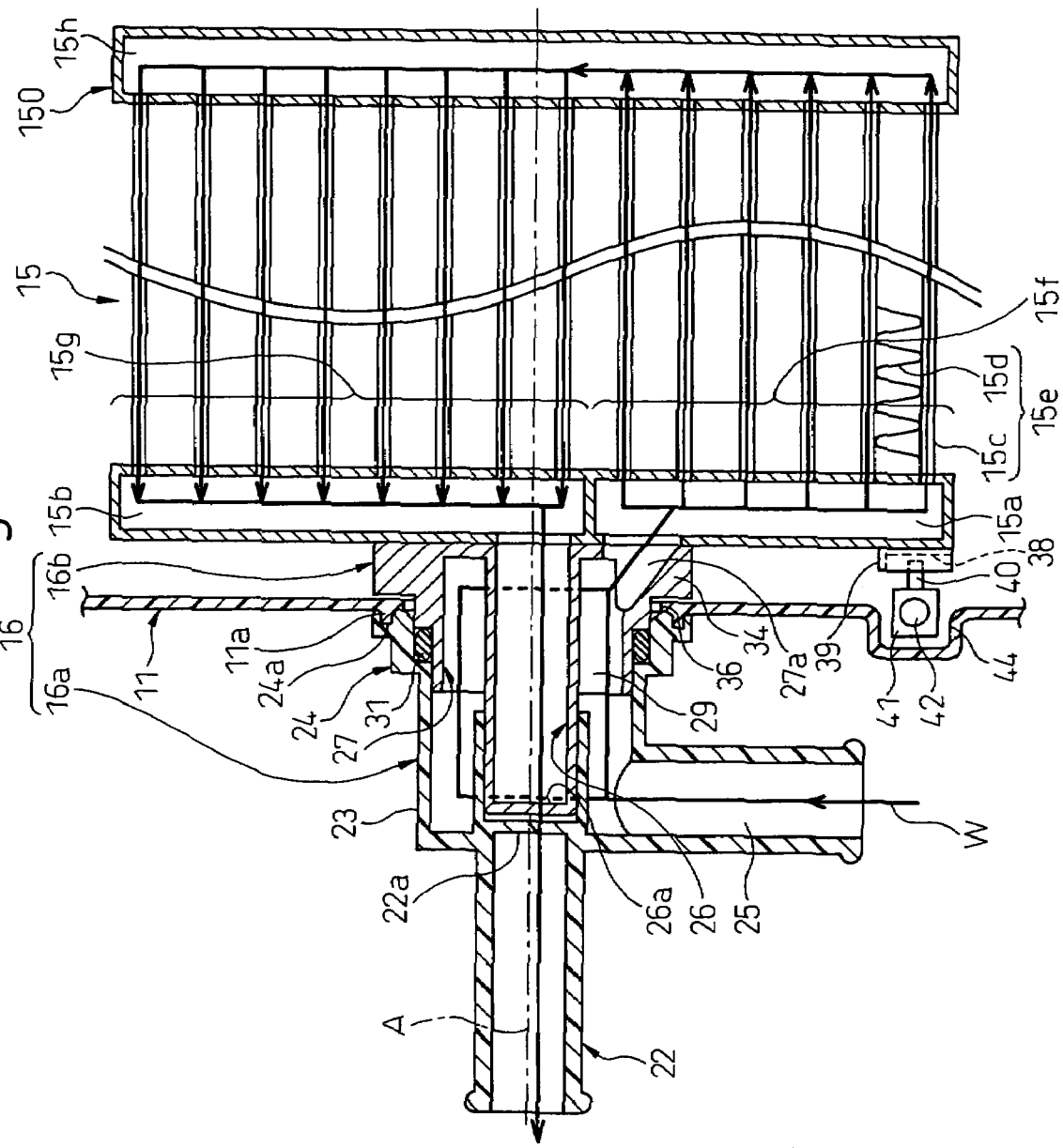
FIG. 8 is a sectional view of principal portions of a rotary-type air conditioning heat exchanger according to a fifth embodiment.

The foregoing embodiments use a so-called "full path type (unidirectional flow type)" heater core for the heater core 15 in which hot water from the hot water inlet tank 15a flows towards the hot water outlet tank 15b through-all the tubes 15c. However, the fifth embodiment uses a so-called "U-turn-type" for the heater core 15 in which the flow of hot water is turned back in the U-form in the stacking direction (vertical direction in FIG. 8) of the flat tubes 15c and the heat transfer corrugated fins 15d as shown in FIG. 8.

A concrete construction of this U-turn-type heater core 15 will be explained. The hot water inlet tank 15a is arranged below the substantial center of the heater core 15 on one of its end sides (on the left in FIG. 8) and the hot water outlet tank 15b is arranged on the substantial center. The intermediate tank 15h is arranged on the other end side (on the right side in FIG. 8) of the heater core 15. The stacked structure of a plurality of flat tubes 15c and a plurality of corrugated heat transfer fins 15d constitute a heat exchange core portion 15e of a transverse U-turn-type between the hot water inlet tank 15a and the intermediate tank 15h and between the hot water outlet tank 15b and the intermediate tank 15h.

Here, the plurality of flat tubes 15c is juxtaposed, in line, in the vertical direction of the car. One of the ends (left end portion) of the first tube group 15f below the substantial center of the car in the vertical direction communicates with the hot water inlet tank 15a. One of the ends (left end portion) of the second tube group 15g above the substantial center of the car in the vertical direction communicates with the hot water outlet tank 15a. The other end (right end) of each of the first and second tube groups 15f and 15g communicates with the intermediate tank 15h.

Therefore, hot water flows in parallel through the first tube group 15f from the hot water inlet tank 15a and flows into the intermediate tank 15h, from thence into the second tube group 15g, passes through the second tube group 15g in parallel with one another and reaches the hot water outlet tank 15b. In other words, hot water turns, in a U-turn, in the stacking direction of the flat tubes 15c and the corrugated heat transfer fins 15d.

Each tank 15a, 15b, 15h has a shape that thinly extends in the arrangement direction of the fat tubes 15c (vertical direction of the car). Here, the hot water inlet tank 15a, the hot water outlet tank 15b, the intermediate tank 15h, the flat tubes 15c and the corrugated heat transfer fins 15d constitute the heat exchanger main body 150 of the heater core 15.

The coaxial double-piping portion 16 for charging and discharging hot water is arranged at the substantial center in the vertical direction of the car on the left end side of the heater core 15. In other words, the coaxial double-piping portion 16 is arranged in such a manner as to extend from the lower end of the hot water inlet tank 15a to the upper end of the hot water outlet tank 15b on the side of the hot water inlet tank 15a and the hot water outlet tank 15b (in the extension direction of the flat tubes 15c).

This coaxial double-piping portion 16 is broadly divided into the fixed portion 16a and the rotary portion 16b in the same way as in the first embodiment. The inner pipe 26 of the rotary portion 16b communicates with the lower end of the hot water outlet tank 15b in the longitudinal direction and the inner passage 27a communicating with the upper end of the hot water inlet tank 15a in the longitudinal direction is formed below the outer pipe 27 of the rotary portion 16b.

Arrow W in FIG. 8 indicates the hot water flow passage. Hot water flowing into the inlet pipe 15 of the fixed portion 16a flows into the hot water inlet tank 15a through the outer pipe 13 of the fixed portion 16a→space 29→inner passage 27a. This hot water is distributed inside the hot water inlet tank 15a into the first tube group 15f and flows through this first tube group 15f from the left side to the right side. Next, this hot water flows through the intermediate tank 15h and then through the second tube group 15g from the right side to the left side, flows into the hot water outlet tank 15b and is gathered there. Hot water then passes through the inner pipe 26 of the rotary portion 16b and flows out from the inner pipe 22 of the fixed portion 16a.

When the U-turn-type is used for the heater core 15 for turning in the U-form the flow of hot water in the stacking direction of the flat tubes 15c and the heat transfer corrugated fins 15d of the heater core 15, the hot water inlet tank 15a and the hot water outlet tank 15b can be arranged in the proximity of the flat tubes 15c in the longitudinal direction. Therefore, hot water flowing into the space 29 of the fixed portion 16a can be caused to flow into the hot water inlet tank 15a from the inner passage 27a.

Accordingly, the communication pipe 28 in the first embodiment becomes unnecessary, the physical size of the heater core 15 inclusive of the coaxial double-piping portion 16 can be rendered compact and the design freedom of the room air conditioner unit 10 can be further improved.

In this embodiment, the coaxial double-piping portion 16 for charging and discharging hot water is arranged at the intermediate portion between the inlet tank (15a) and the outlet tank (15b) as shown in FIG. 8 and the rotation center axis A of the heater core 15 is set to the intermediate position between the hot water inlet tank 15a and the hot water outlet tank 15b of the heater core 15.

Because the rotation center axis A of the heater core 15 is set to the intermediate position of the heater core 15 but not at the end portion of the heater core 15 as shown in FIG. 7, the auxiliary bypass passage 47 can be formed between the end portion of the heater core 15 and the wall surface of the air conditioner case 11 when the heater core 15 is operated and rotated to the intermediate opening position. Accordingly, the temperature difference between the face blow air temperature and the foot blow air temperature (difference of upper and lower air temperatures) can be decreased in the bi-level mode in the same way as in the third embodiment and air conditioning feeling can be improved.

Incidentally, a wall portion 26a having an opening is integrally formed with the inner pipe 26 of the rotary portion 16b in such a manner as to close the distal end portion. A wall portion 22a having an opening that forms a pair with the wall portion 26a having an opening is integrally formed on the inner wall of the inner pipe 22 of the fixed portion 16a. The wall portion 22a having the opening is so arranged as to oppose the wall portion 26a having the opening and to keep close contact with the latter.

In this embodiment, the wall portion 26a having the opening is molded integrally with the inner pipe 26 from a metal such as aluminum and the wall portion 22a having the opening is molded integrally with the inner pipe 22 from a resin. Incidentally, it is also possible to mold the wall portion 26a having the opening from a metal such as aluminum separately from the inner pipe 26 and to integrally join it to the inner pipe 26 by means such as brazing. It is further possible to mold the wall portion 22a having the opening from a resin material separately from the inner pipe 22 and to integrally bond the wall portion 22a having the opening to the inner pipe 22 by means such as bonding and fusing.

Figure 9:
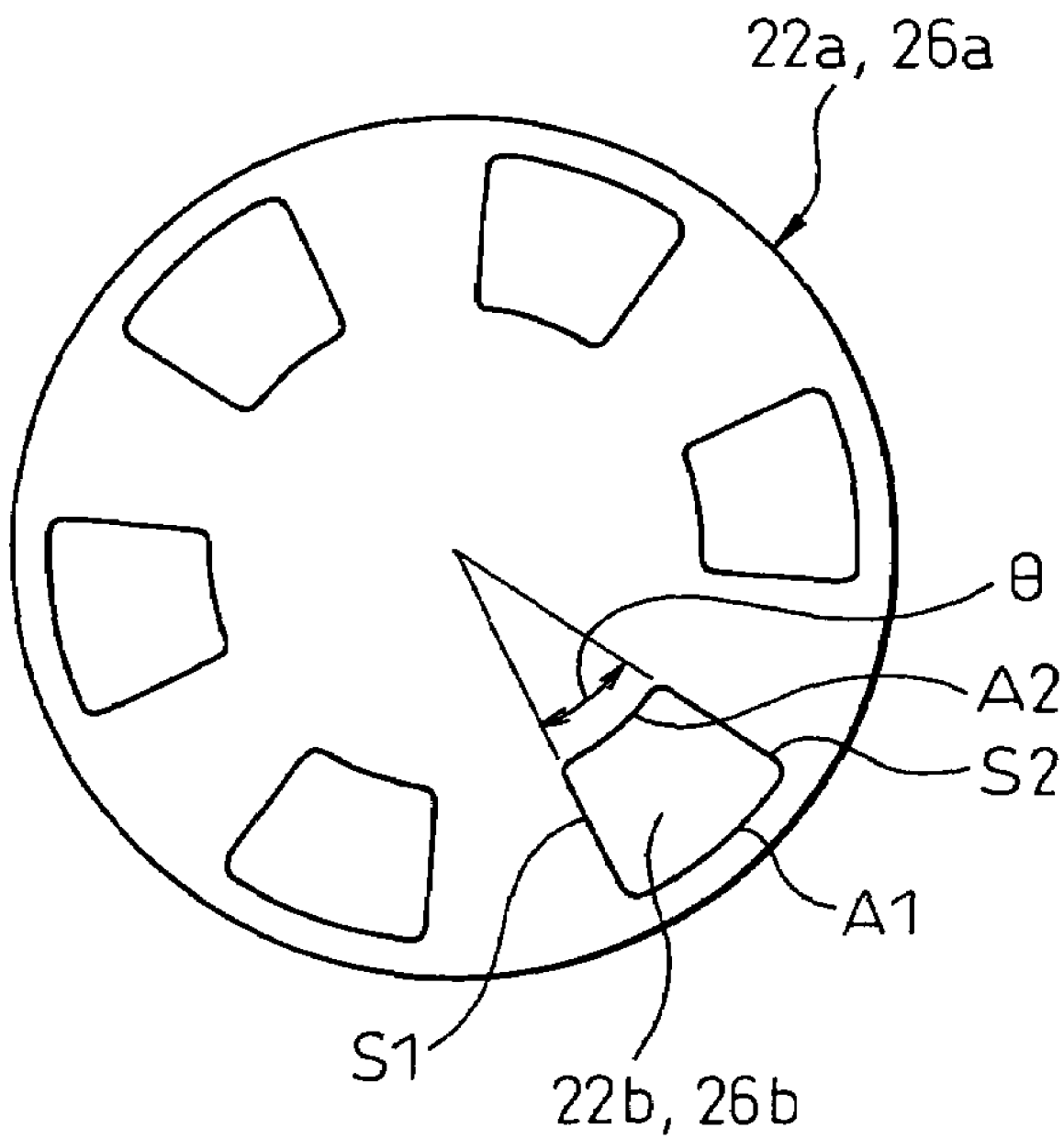
FIG. 9 is a front view of wall portions with apertures 22a and 26a of the rotary-type air conditioning heat exchanger according to the fifth embodiment.

Flow passage ports 22b and 26b for the passage of hot water are provided to the wall portions 22a and 26a having openings, respectively, as shown in FIG. 9. In this embodiment, each flow passage port 22b, 26b has a substantially trapezoidal shape encompassed by an arc A1 on the outer circumferential side, an arc A2 on the inner circumferential side and segments S1 and S2. Six flow passage ports are arranged equidistantly in the circumferential direction of the wall portions 22a, 26a having the opening. Here, the arc A1 on the outer circumferential side and the arc A2 on the inner circumferential side are two arcs that are concentric with the wall portions 22a, 26a having the opening and share the center angle θ. The segment S1 is the one that connects one of the ends of the arc A1 on the outer circumferential side and the arc A2 on the inner circumferential side, and the segment S2 is the one that connects the other end of the arc A1 on the outer circumferential side and the arc A2 on the inner circumferential side.

The overlapping amount of the flow passage ports 22b and 26b of the wall portions 22a, 26a having the opening changes depending on the rotating position of the heater core 15 and these flow passage ports can interrupt the flow of hot water. In other words, when the heater core 15 exists at the rotating position of maximum cooling, the overlapping amount of the flow passage ports 22b and 26b does not at all exist and this is the fully closed state. As the flow of hot water to the heater core 15 is cut off, the heat core 15 stops radiating heat. When the heater core 15 exists at the rotating position of maximum warming, the overlapping amount of the passage ports 22b and 26b is maximum and the flow quantity of hot water inside the heater core 15 reaches maximum. Therefore, the heater core 15 is in the maximum warming condition.

The first embodiment uses the inner leak seal mechanism 30 that uses the O ring at the fitting position between the distal end of the outer peripheral surface of the inner pipe 26 and the inner peripheral surface of the outer pipe 23. In this embodiment, however, a predetermined degree of adhesion is secured at the fitting portion between the distal end of the outer peripheral surface of the inner pipe 26 and the inner peripheral surface of the outer pipe 23 so as to limit the quantity of hot water flowing and bypassing the heater core 15 to a level below an allowable value. As a result, the drop of warming performance resulting from the bypass of hot water through the heater core 15 can be limited to the level below the allowable value and the seal mechanism 30 is abolished. In consequence, the rotation frictional force of the seal member portion can be decreased and the rotation driving force of the heater core 15 can be further reduced.

In this embodiment, a ring-like protuberance portion 11a is formed on the outer circumferential side of the through-hole 36 on the wall surface of the air conditioner case 11 and a ring-like recess portion 24a meshing with this protuberance portion 11a is formed on the ring-like portion 24 of the fixed portion 16a. When the ring-like protuberance portion 11a of the air conditioner case 11 fits to the ring-like recess portion 24a of the ring-like portion 24 of the fixed portion 16a, a labyrinth structure is formed and leak of air inside the air conditioner case 11 to the outside, through the clearance between the ring-like portion 24 of the fixed portion 16a and the through-hole 36, can be prevented. Because seal performance can thus be secured between the ring-like portion 24 of the fixed portion 16a and the through-hole 36, this embodiment does not use the seal packing material 37 used in the first embodiment.

Sixth Embodiment

Figure 10:
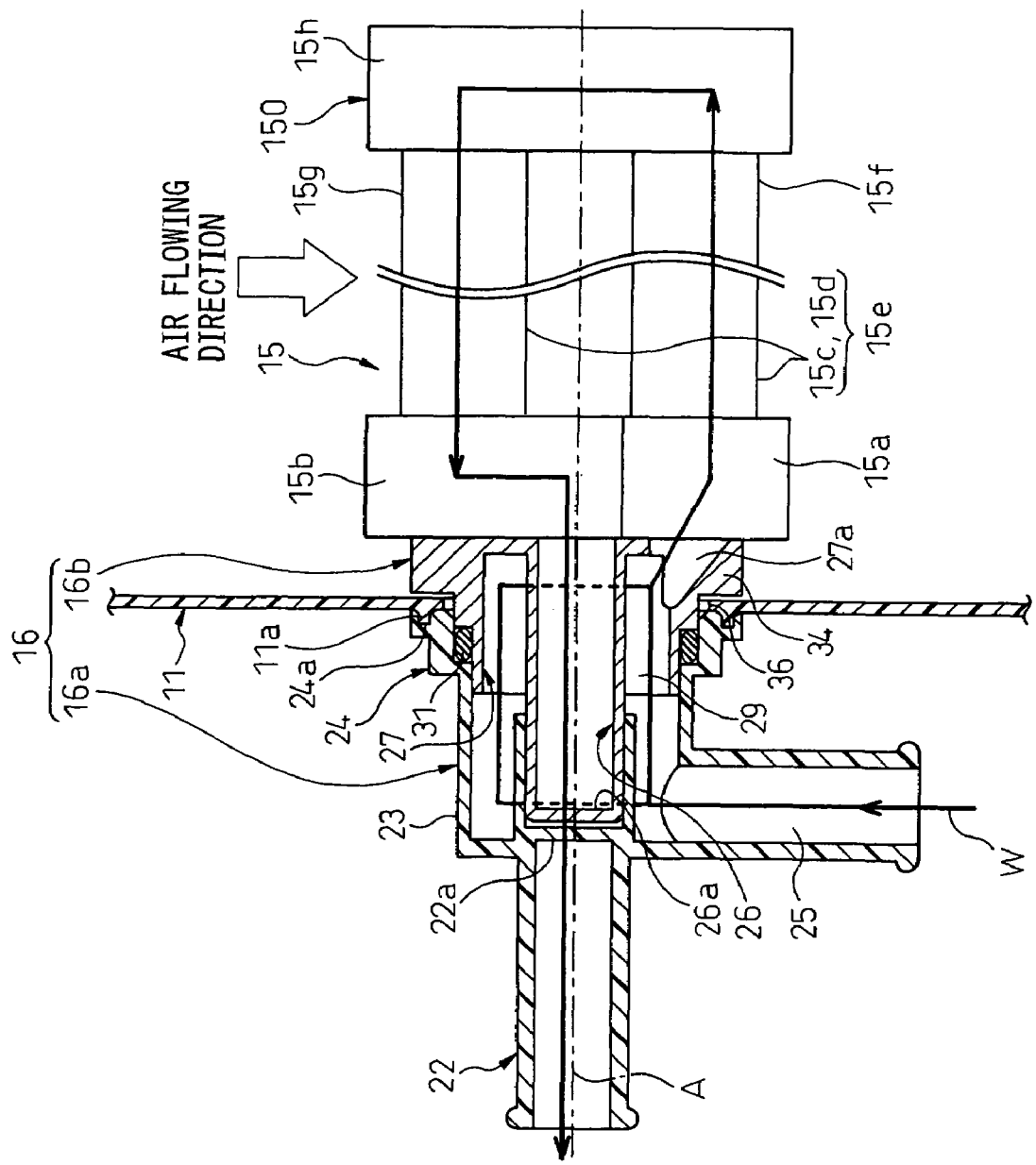
FIG. 10 is a sectional view of principal portions of a rotary-type air conditioning heat exchanger according to a sixth embodiment.

The fifth embodiment described above uses the U-turn-type heater core 15 for turning the flow of hot water in the U-form in the stacking direction (vertical direction in FIG. 8) of the flat tubes 15c and the heat transfer corrugated fins 15d but in the sixth embodiment, a longitudinal U-turn-type for turning in the U-form the flow of hot water in the air flowing direction (vertical direction to the sheet of drawing in FIG. 10) is used as the heater core 15 as shown in FIG. 10.

A concrete construction of this longitudinal U-turn-type heater core 15 will be explained. The hot water inlet tank 15a is arranged on the downstream side of the air flow at one of the ends (left side in FIG. 10) of the heater core 15 and the hot water outlet tank 15b is arranged on the air flow upstream side of this hot water inlet tank 15a. The intermediate tank 15h is arranged at the other end of the heater core 15 (right side in FIG. 10). A plurality of flat tubes 15c and a plurality of corrugated heat transfer fins 15d are stacked in the vertical direction (perpendicular to the sheet of drawing) to the air flowing direction between the hot water inlet tank 15a and the intermediate tank 15h and between the hot water outlet tank 15b and the intermediate tank 15h to constitute the stacked structure. This stacked structure constitutes the longitudinal U-turn-type heat exchange core portion 15e.

Here, a plurality of flat tubes 15c is juxtaposed in two rows in the longitudinal direction of the air flowing direction. Among these flat tubes 15c juxtaposed in two rows, one of the ends of the first tube group 15f (left end) in the row of the downstream side in the air flowing direction communicates with the hot water inlet tank 15a. One of the ends of the second tube group 15g (left end) in the row of the upstream side in the air flowing direction communicates with the hot water outlet tank 15b. The other end (right end) of each of the first and second tube groups 15f and 15g communicates with the intermediate tank 15h.

Therefore, hot water passes in parallel through the first tube group 15f from the hot water inlet tank 15a, flows into the intermediate tank 15h and then into the second tube group 15g, passes in parallel through the second tube group 15g and flows into the hot water outlet tank 15b. In other words, hot water exhibits U-turn back and forth in the air flowing direction.

Each tank 15a, 15b, 15h has a shape that thinly extends in the stacking direction of the flat tubes 15c and the corrugated heat transfer fins 15d (perpendicular to the sheet of the drawing). Here, the hot water inlet tank 15a, the hot water outlet tank 15b, the intermediate tank 15h, the flat tubes 15c and the corrugated heat transfer fins 15d constitute the heat exchanger main body portion 150 of the heater core 15.

The coaxial double-piping portion 16 for charging and discharging hot water is arranged at the substantial center of the heater core 15 on the left end side in the air flowing direction. In other words, the coaxial double-piping portion 16 is arranged in such a manner as to extend to both hot water inlet and outlet tanks 15a and 15b.

The coaxial double-piping portion 16 is broadly divided into the fixed portion 16a and the rotary portion 16b in the same way as in the fifth embodiment. The inner pipe 26 of the rotary portion 16b communicates with the hot water outlet tank 15b and an inner passage 27a communicating with the hot water inlet tank 15a is formed below the outer pipe 27 of the rotary portion 16b.

Arrow W in FIG. 10 indicates the hot water flow passage. Hot water flowing into the inlet pipe 25 of the fixed portion 16a flows into the hot water inlet tank 15a through the outer pipe 23 of the fixed portion 16a→space 29→inner passage 27a. This hot water is distributed to the first tube group 15f inside the hot water inlet tank 15a and flows through the first tube group 15f from the left side to the right side. Next, this hot water flows from the intermediate tank 15h through the second tube group 15g from the left side to the right side, flows into the hot water outlet tank 15b and is gathered there. Hot water then passes through the inner pipe 26 of the rotary portion 16b and flows out to the inner pipe 22 of the fixed portion 16a.

When the longitudinal U-turn-type for causing U turn of the flow of hot water in the longitudinal direction of the air flowing direction (perpendicular to the sheet of drawing in FIG. 19) is used as the heater core 15 in this way, the hot water inlet tank 15a and the hot water outlet tank 15b are arranged in the proximity of one of the ends of the flat tubes 15c in their longitudinal direction. Therefore, hot water flowing into the space 29 of the fixed portion 16a can be caused to flow into the hot water outlet tank 15b through the inner passage 27a.

Consequently, the communication pipe 28 used in the first embodiment becomes unnecessary and the physical structure of the heater core 15, inclusive of the coaxial double-piping portion 16, can be made compact and the design freedom of the room air conditioner unit 10 can be further improved.

Incidentally, as the rotation driving mechanism of the heater core 15 in this embodiment may be the same as that of the first embodiment, it is omitted from the drawings.

Seventh Embodiment

The foregoing embodiments represent the application of the invention to the air-mix-type air conditioner for cars that controls the proportion of hot water passing through the heater core 15 and cooling air bypassing the heater core 15, and controls the temperature of air blown into the passenger compartment. In contrast, the seventh embodiment represents the application example of the invention to an independent control system air conditioner for cars that independently controls the proportion of hot air passing through the heater core 15 to cooling air bypassing the heater core 15 inside two air passages 48 and independently controls the temperatures of air blown from these two air passages 48 into the passenger compartment.

First, the outline of the independent control type air conditioner for cars according to this embodiment will be explained. Two heater cores 15 are juxtaposed with each other in the transverse direction of the car (perpendicular to the sheet of drawing) inside the air conditioner case 11 shown in FIG. 1. Two partitions 11b (shown in FIG. 11) made of a resin are sandwiched between these two heater cores 15 and are fastened by fitting means, not shown, such as screw fastening to the air conditioner case 11. These two partitions 11b extend to the downstream side of the heater cores 15, that is, to the upper part of the air conditioner case 11.

Figure 11:
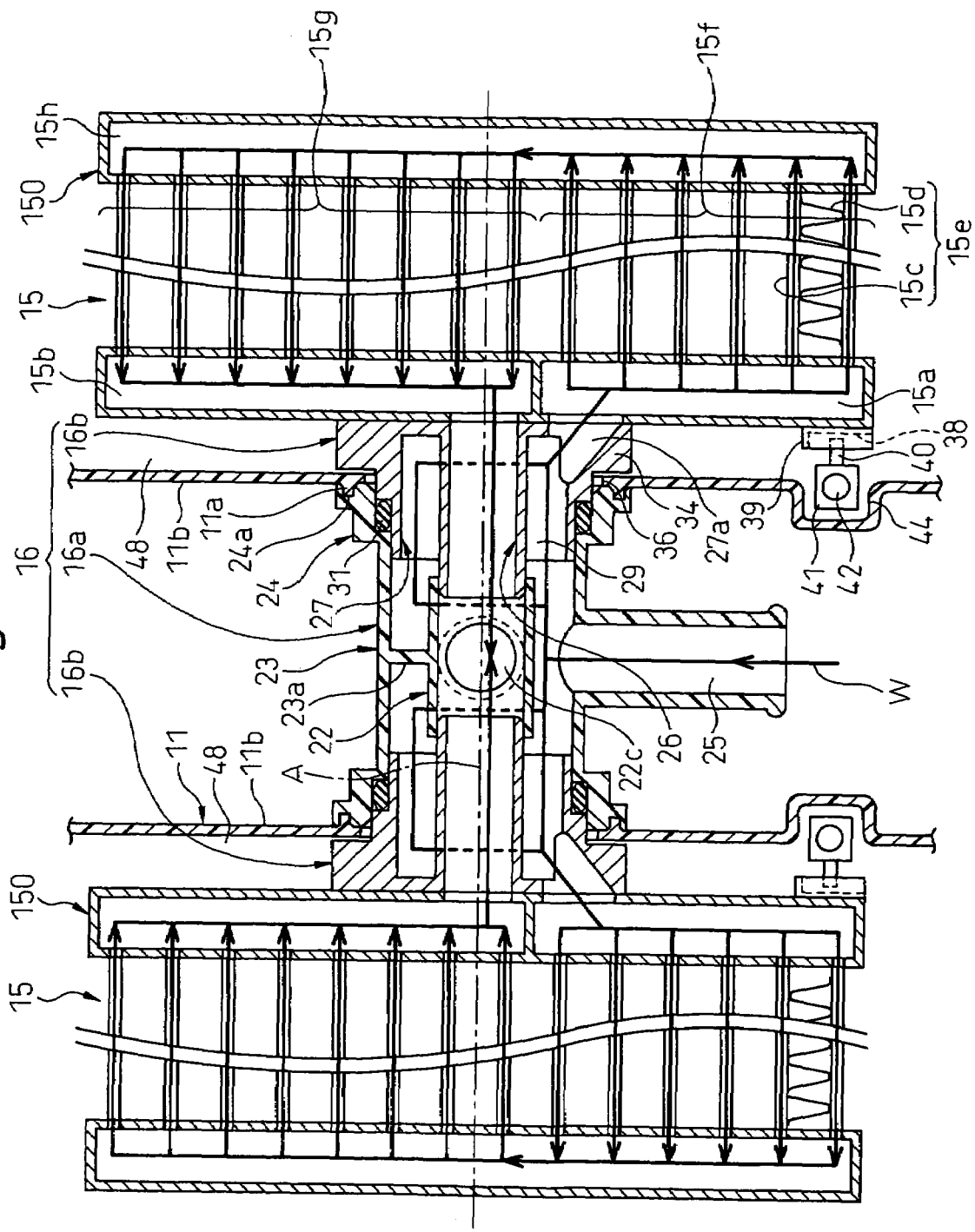
FIG. 11 is a sectional view of the principal portions of a rotary-type air conditioning heat exchanger according to a seventh embodiment.

As shown in FIG. 11, two air passages 48 are formed in parallel with each other inside the air conditioner case 11 by the space encompassed by the air conditioner case 11 and the two partitions 11b. Hot air passing through each heater core 15 reaches each blow opening portion 19, 20, 21 without being mixed with each other through these two air passages 48.

Each blow opening portion 19, 20, 21 has an opening portion connected to the blow port on the left side of the car and an opening portion connected to the blow port on the left side of the car. Hot air passing through the heater core 15 on the left side of the car flows through each opening portion connected to the blow port on the left side of the car and is blown into the passenger compartment from each blow port. Similarly, hot air passing through the heater core 15 on the right side of the car flows through each opening portion connected to the blow port on the right side of the car and is blown into the passenger compartment from each blow port.

The two heater cores 15 are assembled independently of each other into the two air passages 48 in such a manner as to be capable of rotating. Therefore, when the heater core 15 on the left side of the car and the heater core 15 on the right side are operated and rotated independently of each other, the proportion of hot air passing through the heater core 15 and cooling air bypassing the heater core 15 can be controlled independently and respectively inside the two air passages 48. Consequently, the temperature of the blow air blown from each blow port on the left side of the car into the passenger-compartment and the temperature of blow air blown from each blow port on the right side can be independently controlled.

Next, a concrete construction of this embodiment will be explained with reference to FIG. 11. In this embodiment, two U-turn-type heater cores 15 similar to that of the fifth embodiment, for causing U-turn of the flow of hot water in the stacking direction (vertical direction in FIG. 8) of the flat tubes 15c and the heat transfer corrugated fins 15d of the heater core 15 are juxtaposed and used as the heater cores on the right and left sides of the car.

The sides of these two heater cores 15 on the side of the hot water inlet tank 15a and the hot water outlet tank 15b oppose each other (in the extension direction of the flat tubes 15c) and the hot water outlet tank 15b is positioned above the hot water inlet tank 15a. In other words, the two heater cores 15 are arranged symmetrically with each other.

The coaxial double-piping portion 16 is arranged between the two heater cores 15 in such a manner as to extend from the lower end of the hot water outlet tank 15b to the upper end of the hot water inlet tank 15a. The single coaxial double-piping portion 16 is broadly divided into one fixed portion 16a and two rotary portions 16b.

Here, the fixing portion 16a is the one that is fixed to the air conditioner case 11 by fitting means such as screw fastening, not shown in the drawing. The two rotary portions 16b are rotary members that are integrally coupled to the heat exchanger main body 150 of the two heater cores 15, respectively, and rotate with the heat exchanger main body 150.

The fixed portion 16a is arranged at the substantial center between the two heater cores 15 in the transverse direction of the car. The fixed portion 16a includes the inner pipe 22 as the minimum diameter portion, the outer pipe 23 having a diameter greater than that of the inner pipe 22 and the ring-like portion 24 as the maximum diameter portion having a diameter greater than that of the outer pipe 23.

The inner pipe 22 and the outer pipe 23 constitute a double-piping structure in the axial direction of the coaxial double-piping portion 16 (in the extension direction of the flat tubes 15c) and two ring-like portions 24 are arranged at both ends of the outer pipe 23. The inner pipe 22, the outer pipe 23 and the ring-like portion 24 are formed into the concentric shapes having the rotation center axis A of the heater core 15 as the center.

The outlet pipe 22c for flowing hot water outside the fixed portion 16a is connected in the straight direction (perpendicular to the sheet of drawing in FIG. 1 and to the back of the sheet) to the inner pipe 22. The outlet pipe 22c penetrates through the outer pipe 23 and extends outside the fixed portion 16a.

The inlet pipe 25 for causing hot water to flow is coupled to the inside of the outer pipe 23 in the direction orthogonal to the outer pipe 2 (downward in FIG. 11). The double-wall-piping portion of the inner pipe 22 and the outer pipe 23 are integrally connected by a plurality of radial connection portions 23a. Incidentally, the fixed portion 16a in this embodiment is integrally molded from a resin material.

On the other hand, two rotary portions 16b are symmetrically arranged on both right and left sides of the fixed portion 16a in the transverse direction. These two rotary portions 16b have the same structure as that of the rotary portion 16b in the fifth embodiment. In other words, the inner pipe 26 of the rotary portion 16b communicates with the lower end of the hot water outlet tank 15b in the longitudinal direction and the inner passage 27a communicating with the upper end of the hot water inlet tank 15a in the longitudinal direction is formed below the outer pipe 27 of the rotary portion 16b.

Arrow W in FIG. 11 indicates the flow passage of hot water. Hot water flowing into the inlet pipe 25 of the fixed portion 16a is distributed in the transverse direction in FIG. 10 in the outer pipe 23 of the fixed portion 16a. Among the flows of hot water distributed in the transverse direction, hot water flowing to the right in FIG. 11 flows into the hot water inlet tank 15a of the right-side heater core 15 through the outer pipe 23→space 29→inner passage 27a. This hot water is distributed inside the hot water inlet tank 15a to the first tube group 15f in the same way as in the fifth embodiment and flows from the left side to the right side through this first tube group 15f.

Next, this hot water flows from the right side to the left side inside the second tube group 15g through the intermediate tank 15h and is gathered there. Hot water then passes through the inner pipe 26 of the rotary portion 16b from the right side to the left side and flows into the inner pipe 22 of the fixed portion 16a. On the other hand, of the flow of hot water distributed in the transverse direction, hot water flowing in the left direction in FIG. 11 flows symmetrically with respect to hot water flowing to the right direction, passes through the inner pipe 26 of the rotary portion 16b from the left side to the right side and flows into the inner pipe 22 of the fixed portion 16a.

The flow of hot water distributed in the transverse direction is gathered in the inner pipe 22 of the fixed portion 16a and flows out to the outlet pipe 22c of the fixed portion 16a. Because the outlet pipe 22c of the fixed portion 16a is connected to the hot water suction side of the car engine hot water circuit, hot water of the outlet pipe 22c of the fixed portion 16a is refluxed to the car engine hot water circuit.

Next, the assembly structure of the two heater cores 15 to the air conditioner case 11 will be explained. As the rotary portion 16b of the coaxial double-piping portion 16 is in advance integrated with each heater core 15, each heater core 15 is assembled into the air conditioner case 11 with the rotary portion 16b.

More concretely, a shaft portion (not shown) is disposed at the substantial center on the side of the intermediate tank 15h of the right-side heater core 15 in FIG. 11 (in the extension direction of the flat tubes 15c) and a fitting recess for bearing (not shown) to which the shaft portion fits in such a manner as to be capable of rotating is disposed on the wall surface, not shown, of the air conditioner case 11. Therefore, the shaft portion at the substantial center on the side of the intermediate tank 15h of the right-side heater core 15 is fitted into the fitting recess for heating, of the air conditioner case 11, in such a manner as to be capable of rotating.

Next, the right-side partition 11b of the two partitions 11b is assembled into the air conditioner case 11. A round through-hole 36, having an inner diameter greater by a predetermined amount than the outer diameter of the ring-like portion 24 of the partition 16a, is bored in the right-side partition 11b. The double piping portion including the inner pipe 26 of the rotary portion 16b positioned at the substantial center of the right-hand heater core 15 on the side of the hot water outlet tank 15b and the outer pipe 27 is fitted into the through-hole 36 of the right-side partition 11b.

The ring-like recess 24a of the ring-like portion 24 of the fixed portion 16a of the coaxial double-piping portion 16 is fitted to the ring-like protuberance 11a on the outer peripheral side of the through-hole 36 of the right-side partition 11b and the outer pipe 23 of the fixed portion and the inner peripheral surface of the ring-like portion 24 are fitted onto the outer peripheral surfaces of the inner and outer pipes 26 and 27.

Next, the left-side partition 11b is assembled into the air conditioner case 11. A round through-hole 36 is bored in this left-side partition 11b in the same way as in the right-side partition 11b. The double-piping portion consisting of the inner pipe 26 and the outer pipe 27 of the rotary portion 16b of the right-hand heater core 15 is fitted into the through-hole 36 of the left-side partition 11b, and the outer peripheral surfaces of the inner and outer pipes 26 and 27 of the rotary portion 16b are fitted to the outer pipe 23 of the fixed portion 16a and the inner peripheral surface of the ring-like portion 24.

When an independent-control-system car air conditioner is constituted in this way, only one fixed portion 16a needs be disposed for the two core heaters 15. Therefore, the physical structure of the whole coaxial double-piping portion 16 can be rendered more compact than when one fixed portion 16a used in the first embodiment is disposed for each of the two heater cores 15. Consequently, the physical structure of the two heater cores 15 inclusive of the double-piping portion 16 can be rendered compact as a whole and design freedom of the room air conditioner unit 10 can be improved.

The outer pipe 23 of the fixed portion 16a distributes hot water to the two heater cores 15 and the inner pipe 22 of the fixed portion 16a gathers hot water from the two heater cores 15. Therefore, the piping joint portion with the car engine hot water circuit can be gathered to one position. As a result, the trouble of piping connection with the car engine hot water circuit for the two heater cores 15 can be eliminated in the independent-control-system car air conditioner and the assembly operation factor of piping connection with the car engine hot water circuit can be improved.

Other Embodiments

In the embodiment described above, the flow passage ports 22b and 26b respectively formed in the wall portion 22a having the opening in the fixed portion 16a and the wall portion 26a having the opening in the inner pipe 26 of the rotary portion 16b have a substantially trapezoidal shape and six flow passage ports are arranged equidistantly in the circumferential direction of the wall portions 22a, 26a having the opening, respectively. However, the flow passage ports 22b and 26b may have shapes other than the trapezoidal shapes such as a circle or rectangle, and the number of the flow passage ports 22b and 26b arranged may be increased or decreased from 6.

In the seventh embodiment described above, two partitions 11b are interposed between the two heater cores 15 to form two air passages 48 inside the air conditioner case 11. However, two air passages 48 may be formed by arranging only one partition 11b at the substantial center between the two heater cores 15.

In the foregoing embodiments, the fixed portion 16a of the coaxial double-piping portion 16 is molded separately from the air conditioner case 11. As the fixed portion 16a and the air conditioner case 11 are the members molded from the resin, however, the fixed portion 16a may be molded integrally with the air conditioner case 11 from the resin.

The foregoing embodiments explain the application example to the rotary-type heater core 15 but the coaxial double-piping portion 16 according to the invention may also be applied to the fixed-type heater core that does not rotate, that is, a heater core fixed and held at a predetermined position inside the air conditioner case 11.

The foregoing embodiments explain the application example to the heater core 15 using hot water as the heat source fluid but the invention may also be applied to a heat exchanger for heating air by using and circulating oil such as engine oil, operation oil of hydraulic machine, etc., as the heat source fluid.

The foregoing embodiments explain the application example to the heater core 15 that is a heat exchanger for heating, as the air conditioning heat exchanger. However, the invention may also be applied to a cooling heat exchanger that uses a low temperature fluid (cold water, low temperature coolant, etc) as the heat source fluid.

While the invention has been described by reference to specific embodiments chosen for purposes of illustration, it should be apparent that numerous modifications could be made thereto, by those skilled in the art, without departing from the basic concept and scope of the invention.

The invention claimed is:

1. An air conditioning heat exchanger comprising:
a heat exchanger main body having a core formed by a plurality of tubes through which a heat source fluid passes and a plurality of fins joined to said tubes, the heat exchanger main body further having an inlet tank connected to one of the ends of said tubes in a longitudinal direction, for distributing said heat source fluid to said plurality of tubes and an outlet tank connected to the other end of said tubes in the longitudinal direction, for gathering said heat source fluid from said plurality of tubes, the heat exchanger main body executing heat exchange between air and the heat source fluid, the heat exchanger main body is of a full-path-type in which the heat source fluid flows unidirectionally from the inlet tank towards the outlet tank while passing through the plurality of tubes;
a single piece fixed fluid distribution pipe having a fixed fluid inlet pipe and a fixed fluid outlet pipe;
a single piece rotary fluid distribution pipe having a rotary fluid inlet pipe in communication with the inlet tank of the heat exchanger main body and the fixed fluid inlet pipe and a rotary fluid outlet pipe in communication with the outlet tank of the heat exchanger main body and the fixed fluid outlet pipe for causing said heat source fluid to flow into and out of said heat exchanger main body; wherein
said fluid inlet pipes and said fluid outlet pipes forming a coaxial double-piping structure;
said fixed fluid inlet pipe and said fixed fluid outlet pipe comprises a fixed inner pipe and a fixed outer pipe larger in diameter than said fixed inner pipe, said fixed outer pipe being disposed closer to a side of said heat exchanger main body than said fixed inner pipe;
said rotary fluid inlet pipe and said rotary fluid outlet pipe comprises a rotary inner pipe and a rotary outer pipe larger in diameter than said rotary inner pipe, said rotary inner pipe and said rotary outer pipe are arranged a predetermined distance from said side of the heat exchanger main body;
an inside diameter of said fixed inner pipe continues to an inside diameter of said rotary inner pipe and an inside diameter of said fixed outer pipe continues to an inside diameter of said rotary outer pipe;
said rotary outer pipe communicates with said fixed outer pipe and said rotary inner pipe communicates with said fixed inner pipe;
said heat exchanger main body is so constituted as to be capable of rotating with a center axis of said coaxial double-piping structure as the center;
a communication pipe disposed outside of the tubes communicates the rotary outer pipe with one of the inlet and outlet tanks; and
the fixed inner pine, the rotary inner pipe and the other of the inlet and outlet tanks are coaxially arranged and these three communicate with each other.

2. An air conditioning heat exchanger according to claim 1, wherein said single piece rotary distribution pipe is integrally brazed to said heat exchanger main body.

3. An air conditioning heat exchanger according to claim 1, wherein said rotary fluid inlet pipe and said rotary fluid outlet pipe are sealed and fixed to said heat exchanger main body through a sealing member using mechanical coupling means.

4. An air conditioning heat exchanger according to claim 1, wherein
said coaxial double-piping structure is arranged at a portion of said heat exchanger main body on the side of said outlet tank.

5. An air conditioning heat exchanger according to claim 1, wherein
said coaxial double-piping structure is arranged at a portion of said heat exchanger main body on the side of said inlet tank.

6. A car air conditioner having said air conditioning heat exchanger according to claim I and an air conditioner case in which air flows into a passenger compartment, wherein:
said air conditioning heat exchanger is arranged inside said air conditioner case in such a manner as to be capable of rotating; and
a proportion of hot air or cold air passing through said air conditioning heat exchanger to air bypassing said air conditioning heat exchanger is regulated by changing the rotating position of said air conditioning heat exchanger.

7. An air conditioning heat exchanger according to claim 1, wherein each of said rotary fluid inlet pipe and said fixed fluid inlet pipe comprises an outer piping and each of said rotary fluid outlet pipe and said fixed fluid outlet pipe comprises an inner pipe in said coaxial double-piping structure.

8. A car air conditioner having said air conditioning heat exchanger according to claim 7 and an air conditioner case in which air flows into a passenger compartment, wherein:
said air conditioning heat exchanger is arranged inside said air conditioner case in such a manner as to be capable of rotating;
a proportion of hot air or cold air passing through said air conditioning heat exchanger to air bypassing said air conditioning heat exchanger is regulated by changing the rotating position of said air conditioning heat exchanger;
a fine clearance passage exists in a contact surface on which said rotary fluid inlet pipe keeps contact with said fixed fluid inlet pipe in said outer pipe of said coaxial double-piping structure; and
an outlet side portion of said fine clearance passage from which said heat source flows out to the outside communicates with the inside of said air conditioner case.

9. A car air conditioner according to claim 8, wherein a drain port is arranged substantially at the lowermost part inside said air conditioner case.

10. An air conditioning heat exchanger according to claim 1, wherein each of said rotary fluid inlet pipe and said fixed fluid inlet pipe comprises an inner pipe and each of said rotary fluid outlet pipe and said fixed fluid outlet pipe comprises an outer pipe in said coaxial double-piping structure.

11. A car air conditioner having said air conditioning heat exchanger according to claim 10 and an air conditioner case in which air flows into a passenger compartment, wherein:

said air conditioning heat exchanger is arranged inside said air conditioner case in such a manner as to be capable of rotating;

a proportion of hot air or cold air passing through said air conditioning heat exchanger to air bypassing said air conditioning heat exchanger is regulated by changing the rotating position of said air conditioning heat exchanger;

a fine clearance passage exists in a contact surface on which said rotary fluid outlet pipe keeps contact with said fixed fluid outlet pipe in said outer pipe of said coaxial double-piping structure; and an outlet side portion of said fine clearance passage from which said heat source fluid flows out to the outside communicates with the inside of said air conditioner case.

12. An air conditioning heat exchanger according to claim 1, wherein said coaxial double-piping structure includes an inner leak seal mechanism for preventing said heat source fluid from directly leaking from said fixed fluid inlet pipe to said fixed fluid outlet pipe and an outer leak seal mechanism for preventing said heat source fluid from directly leaking to the outside, and both of said inner and outer leak seal mechanisms have a cylindrical seal structure using an O ring.

13. An air conditioning heat exchanger comprising: a heat exchanger main body for conducting heat exchange between air and a heat source fluid said heat exchanger main body includes a core formed by a plurality of tubes through which said heat source fluid passes and a plurality of fins joined to said tubes, the inlet tank being connected to one of the ends of said tubes in a longitudinal direction, for distributing said heat source fluid to said plurality of tubes and the outlet tank being connected to the other end of said tubes in the longitudinal direction, for gathering said heat source fluid from said plurality of tubes;

said heat exchanger main body is of a full-path-type in which said heat source fluid flows unidirectionally from said inlet tank towards said outlet tank while passing through said plurality of tubes;

a single piece fixed fluid distribution pipe having a fixed fluid inlet pipe and a fixed fluid outlet pipe; and a single piece rotary fluid distribution pipe having a rotary fluid inlet pipe in communication with the inlet tank of the heat exchanger main body and the fixed fluid inlet pipe and a rotary fluid outlet pipe in communication with the outlet tank of the heat exchanger main body and the fixed fluid outlet pipe for causing said heat source fluid to flow into and out from said heat exchanger main body;

said fluid inlet pipes and said fluid outlet pipes forming a coaxial double-piping structure;

said fixed fluid inlet pipe and said fixed fluid outlet pipe comprises a fixed inner pipe and a fixed outer pipe larger in diameter than said fixed inner pipe, said fixed outer pipe being disposed closer to a side of said heat exchanger main body than said fixed inner pipe;

said rotary fluid inlet pipe and said rotary fluid outlet pipe comprises a rotary inner pipe and a rotary outer pipe larger in diameter than said rotary inner pipe, said rotary inner pipe and said rotary outer part are arranged a predetermined distance from said side of the heat exchanger main body;

an inside diameter of said fixed inner pipe continues to an inside diameter of said rotary inner pipe and an inside diameter of said fixed outer pipe continues to an inside diameter of said rotary outer pipe;

said rotary outer pipe communicates with said fixed outer pipe and said rotary inner pipe communicates with said fixed inner pipe;

a communication pipe disposed outside of the tubes communicates the rotary outer nine with one of the inlet and outlet tanks; and the fixed inner pipe, the rotary inner pipe and the other of the inlet and outlet tanks are coaxially arranged and these three communicate with each other.

* * * * *